US010422158B2

(12) United States Patent
Strombeck et al.

(10) Patent No.: US 10,422,158 B2
(45) Date of Patent: Sep. 24, 2019

(54) REPLACEABLE ANTIMICROBIAL SYSTEM

(71) Applicant: SafeHandles, LLC, Eureka, CA (US)

(72) Inventors: Steven M. Strombeck, Arcata, CA (US); Douglas P. Gibbs, Yuba City, CA (US); Jason Earl Sannar, Live Oak, CA (US); John L. Bergenske, Arcata, CA (US)

(73) Assignee: SafeHandles, LLC, Eureka, CA (US)

( * ) Notice: Subject to any disclaimer, the term of this patent is extended or adjusted under 35 U.S.C. 154(b) by 149 days.

(21) Appl. No.: 15/711,572

(22) Filed: Sep. 21, 2017

(65) Prior Publication Data

US 2018/0044939 A1 Feb. 15, 2018

Related U.S. Application Data

(63) Continuation-in-part of application No. 13/975,757, filed on Aug. 26, 2013, now abandoned.
(Continued)

(51) Int. Cl.
*F26B 25/00* (2006.01)
*E05B 1/00* (2006.01)
(Continued)

(52) U.S. Cl.
CPC .......... *E05B 1/0061* (2013.01); *E05B 1/0069* (2013.01); *B29C 35/049* (2013.01);
(Continued)

(58) Field of Classification Search
CPC .......... E05B 1/0069; A47L 4/00; A47L 13/16; A47L 25/04; A47L 2601/04; A47L 11/38; A61L 2/07
See application file for complete search history.

(56) References Cited

U.S. PATENT DOCUMENTS

| 2,642,209 A | 6/1953 | Davis |
| 2,927,625 A | 3/1960 | Rothermel |
(Continued)

FOREIGN PATENT DOCUMENTS

| DE | 102009050425 | 5/2011 |
| EP | 0797965 | 8/2001 |
(Continued)

OTHER PUBLICATIONS

Antimicrobial Additive Masterbatches and Powder Dispersions, Article from Wells Plstics Ltd., Received and Printed on Jul. 11, 2013.
(Continued)

*Primary Examiner* — Jason Lau
(74) *Attorney, Agent, or Firm* — Neustel Law Offices

(57) ABSTRACT

A replaceable antimicrobial system for providing a replaceable antimicrobial surface to inhibit and reduce microorganism growth on a surface. The replaceable antimicrobial system generally includes providing an antimicrobial cover, positioning the antimicrobial cover upon an object such as a handle, and securing the antimicrobial cover to the object or removably affixing the antimicrobial cover with adhesive. The securing of the antimicrobial cover is accomplished by heat shrinking the antimicrobial cover upon the object. Alternatively, the securing of the antimicrobial cover is accomplished by an adhesive backing attached to the antimicrobial cover. After a period of time of usage where the antimicrobial cover loses its effectiveness to inhibit microorganisms, the antimicrobial cover is removed and a replaced with a new antimicrobial cover.

29 Claims, 36 Drawing Sheets

Related U.S. Application Data

(60) Provisional application No. 61/775,178, filed on Mar. 8, 2013, provisional application No. 61/740,144, filed on Dec. 20, 2012.

(51) Int. Cl.
  *B29C 35/04* (2006.01)
  *E05B 15/16* (2006.01)
  *C09J 7/29* (2018.01)

(52) U.S. Cl.
  CPC ......... *B29K 2995/0049* (2013.01); *C09J 7/29* (2018.01); *E05B 15/1607* (2013.01); *Y10T 29/4973* (2015.01); *Y10T 29/49826* (2015.01)

(56) References Cited

U.S. PATENT DOCUMENTS

| | | | |
|---|---|---|---|
| 2,954,802 | A | 10/1960 | Duff |
| 3,526,109 | A | 9/1970 | Kirche |
| 3,592,380 | A | 7/1971 | Gerard |
| 4,222,198 | A | 9/1980 | Napolitano et al. |
| 4,856,140 | A | 8/1989 | Visco |
| 5,054,063 | A | 10/1991 | Lo et al. |
| 5,292,018 | A | 3/1994 | Travisano |
| 5,972,149 | A | 10/1999 | Schiller et al. |
| 6,024,134 | A | 2/2000 | Akedo et al. |
| 6,254,139 | B1 | 7/2001 | Fresnel |
| 8,375,521 | B1 | 2/2013 | Carson |
| 8,458,853 | B2 | 6/2013 | Charlton et al. |
| 2003/0098084 | A1 | 5/2003 | Ragner et al. |
| 2003/0135947 | A1 | 7/2003 | McKay |
| 2003/0192788 | A1 | 10/2003 | Marco |
| 2003/0208872 | A1 | 11/2003 | Tsen |
| 2004/0011685 | A1 | 1/2004 | Lux, Jr. et al. |
| 2004/0231096 | A1 | 11/2004 | Battle et al. |
| 2005/0249897 | A1 | 11/2005 | Fresnel |
| 2006/0000241 | A1 | 1/2006 | Rosenzweig |
| 2006/0168748 | A1* | 8/2006 | Dotterman .............. A47L 13/12 15/115 |
| 2006/0230576 | A1 | 10/2006 | Meine |
| 2007/0050938 | A1* | 3/2007 | Rosenzweig ........... A47L 11/34 15/322 |
| 2007/0119487 | A1 | 5/2007 | Taylor et al. |
| 2008/0185083 | A1 | 8/2008 | Balbosa |
| 2008/0229612 | A1 | 9/2008 | Sommer |
| 2009/0130157 | A1 | 5/2009 | Yliltalo |
| 2010/0212098 | A1* | 8/2010 | Vrdoljak .................. B08B 1/00 15/209.1 |
| 2010/0269287 | A1 | 10/2010 | Vrdoljak et al. |
| 2010/0281781 | A1 | 11/2010 | Badgley |
| 2011/0048461 | A1 | 3/2011 | Teerlink |
| 2011/0073140 | A1 | 3/2011 | Breit |
| 2011/0111000 | A1 | 5/2011 | Russell |
| 2011/0177268 | A1 | 7/2011 | Fresnel |
| 2011/0223227 | A1 | 9/2011 | Badgley |
| 2012/0131822 | A1 | 5/2012 | Pan |
| 2012/0144610 | A1 | 6/2012 | Balzano |
| 2012/0164201 | A1 | 6/2012 | Harris |
| 2012/0171269 | A1 | 7/2012 | Kostak |
| 2012/0251756 | A1 | 10/2012 | Buckley |
| 2012/0261054 | A1 | 10/2012 | Von Blucher |
| 2013/0086954 | A1 | 4/2013 | Zhang |
| 2014/0150201 | A1 | 6/2014 | McGee et al. |

FOREIGN PATENT DOCUMENTS

| | | |
|---|---|---|
| GB | 2444128 | 5/2008 |
| WO | WO 1990011015 | 4/1990 |
| WO | WO 2008040965 | 4/2008 |
| WO | WO 2008099111 | 8/2008 |
| WO | WO 2009112173 | 9/2009 |
| WO | WO 2010039140 | 8/2010 |
| WO | WO 2011034952 | 3/2011 |
| ZA | 200100558 | 7/2001 |

OTHER PUBLICATIONS

Microban Curve Toilet Handle from Bed Bath & Beyond, Printed on Jul. 18, 2013, www.bedbathandbeyond.com/product.asp?sku=17432184&utm_source=google&utm.

Danco Toilet Handle from Amazon, Received on May 2, 2013, Printed on Jul. 18, 2013, www.amazon.com/Danco-10031-Microban-Toilet-Handle/dp/B003N2NHKW.

Touch Door Knob Covers from Assistive Tech, Received on May 2, 2013, Printed on Jul. 18, 2013, http://assistivetech.net/search/productDisplay.php?product_id=51398.

Doorknob Grips from Active Forever, Received on May 2, 2013, Printed on Jul. 18, 2013, www.activeforever.com/great-grips-doorknob-grips.

Antimicrobial PVC Film from ni Autofilms, Received on May 2, 2013, Printed on Jul. 18, 2013, http://ni-websites.com/niauto/antimicrobial.htm.

SafeHandles Products, Received on May 2, 2013, Printed on Jul. 18, 2013, http://safehandles.com/faq.html.

Press Rlease (Dec. 6, 2001) of Glo-Ring Infrared Heat Tool (http://news.thomasnet.com/fullstory/glo-ring-Infrared-het-tool-345382).

Infrared Heating Products by Eraser, Web Archive date Apr. 13, 2012, images and descriptions describing same tool of the press release. (http://web.archive.org/web/20120413161649/.

* cited by examiner

REPLACEABLE ANTIMICROBIAL SYSTEM

CROSS REFERENCE TO RELATED APPLICATIONS

The present application is a continuation-in-part of U.S. application Ser. No. 13/975,757 filed on Aug. 26, 2013, which claims priority to U.S. Provisional Application No. 61/740,144 filed Dec. 20, 2012 and U.S. Provisional Application No. 61/775,178 filed Mar. 8, 2013. Each of the aforementioned patent applications, and any applications related thereto, is herein incorporated by reference in their entirety.

STATEMENT REGARDING FEDERALLY SPONSORED RESEARCH OR DEVELOPMENT

Not applicable to this application.

BACKGROUND OF THE INVENTION

Field of the Invention

The present invention relates generally to antimicrobial surfaces and more specifically it relates to a replaceable antimicrobial system for providing a replaceable antimicrobial surface to inhibit and reduce microorganism growth on a surface.

Description of the Related Art

Any discussion of the related art throughout the specification should in no way be considered as an admission that such related art is widely known or forms part of common general knowledge in the field.

Private places (e.g. homes) and public places (e.g. restaurants, hotels, hospitals, airplanes, public restrooms) have various microorganisms that are on contact surfaces that individuals touch such as handles, knobs, levers, bars, railings, door handles, doorknobs, faucet levers, faucet knobs, toilet handles, urinal knobs, refrigerator handles, code compliant ADA bars, and railings. Current solutions to keep the contact surfaces clean of microorganisms such as bacteria, mold, mildew and fungi include periodic cleaning with chemicals and sanitizers periodically applied to the surfaces.

However, conventional solutions to reduce microorganisms on contact surfaces are only good immediately after cleaning or sanitizing the contact surface because after the surface is touched by an individual new microorganisms are applied to the contact surface. Furthermore, conventional solutions are labor intensive and require individuals to be diligent in the cleaning and sanitization which may be difficult particularly in high traffic areas such as restaurants and hospitals.

Recent attempts have been made to construct contact surfaces with antimicrobials to inhibit and reduce microorganism grown on the contact surface such as incorporating an antimicrobial within plastic (a.k.a. antimicrobial plastic). While objects that are constructed of antimicrobial materials are effective initially to inhibit microorganism growth on a contact surface, over extended periods of time this antimicrobial effectiveness is reduced thereby either requiring replacement of the object or traditional cleaning/sanitization solutions neither of which is cost effective or desirable.

Because of the inherent problems with the related art, there is a need for a new and improved replaceable antimicrobial system for providing a replaceable antimicrobial surface to inhibit and reduce microorganism growth on a surface.

BRIEF SUMMARY OF THE INVENTION

The invention generally relates to antimicrobial surfaces which includes providing an antimicrobial cover, positioning the antimicrobial cover upon an object such as a handle, and securing the antimicrobial cover to the object. The securing of the antimicrobial cover is accomplished by heat shrinking the antimicrobial cover upon the object. Alternatively, the securing of the antimicrobial cover is accomplished by an adhesive backing attached to the antimicrobial cover. After a period of time of usage where the antimicrobial cover loses its effectiveness to inhibit microorganisms, the inexpensive antimicrobial cover is easily removed and a replaced with a new antimicrobial cover.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1A:
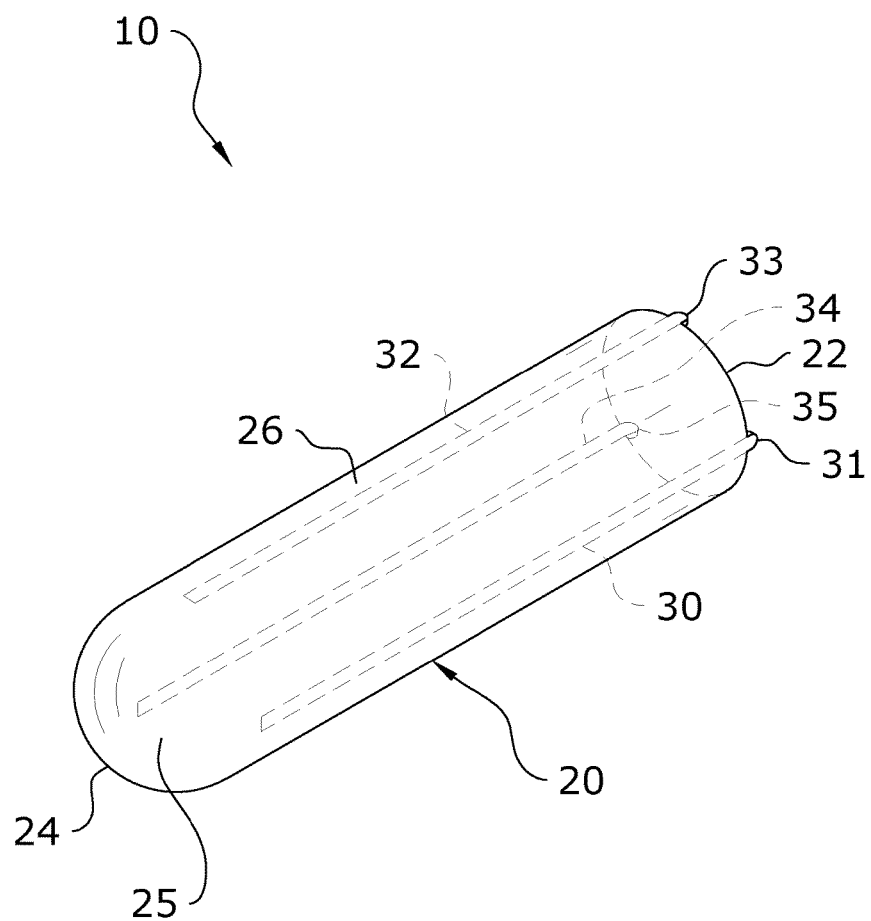
FIG. 1a is a rear upper perspective view of the present invention wherein the second end of the sleeve is comprised of a closed end.

A. Overview.

Turning now descriptively to the drawings, in which similar reference characters denote similar elements throughout the several views, FIGS. 1 through 29 illustrate a replaceable antimicrobial system 10, which comprises providing an antimicrobial cover, positioning the antimicrobial cover upon an object 12 such as a handle, and securing the antimicrobial cover to the object 12. The securing of the antimicrobial cover is accomplished by heat shrinking the antimicrobial cover upon the object 12. Alternatively, the securing of the antimicrobial cover is accomplished by an adhesive backing 51 attached to the antimicrobial cover. After a period of time of usage where the antimicrobial cover loses its effectiveness to inhibit microorganisms, the antimicrobial cover is removed and a replaced with a new antimicrobial cover. The present invention may be utilized upon various types of objects 12 having a contact surface such as but not limited to handles, knobs, levers, bars, railings, door handles, doorknobs, faucet levers, faucet knobs, toilet handles, urinal knobs, refrigerator handles, ADA bars, and railings.

B. Antimicrobial Sleeve.

FIGS. 1a through 7b illustrate the antimicrobial sleeve 20 having an exterior surface, an interior surface opposite of the exterior surface, a lumen defined by the interior surface, a first end 22 and a second end 24 opposite of the first end 22. The antimicrobial sleeve 20 is comprised of a tubular body 26 as illustrated in FIGS. 1a through 2b of the drawings. The antimicrobial sleeve 20 may have a consistent shape through the length thereof, or the antimicrobial sleeve 20 may be formed to a particular shape of handle to be attached to (e.g. curved, a cutout portion at one end to receive an object 12).

Figure 6A:
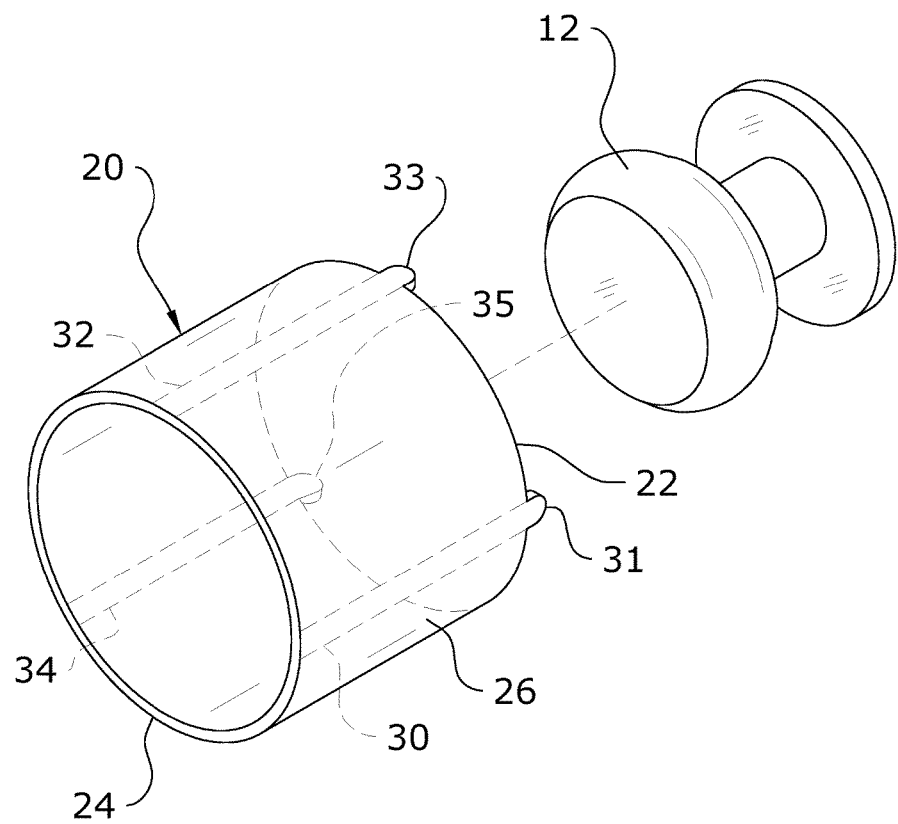
FIG. 6a is an exploded rear upper perspective view of a sleeve having a larger width than length for a knob shaped handle of a door.
Figure 6B:
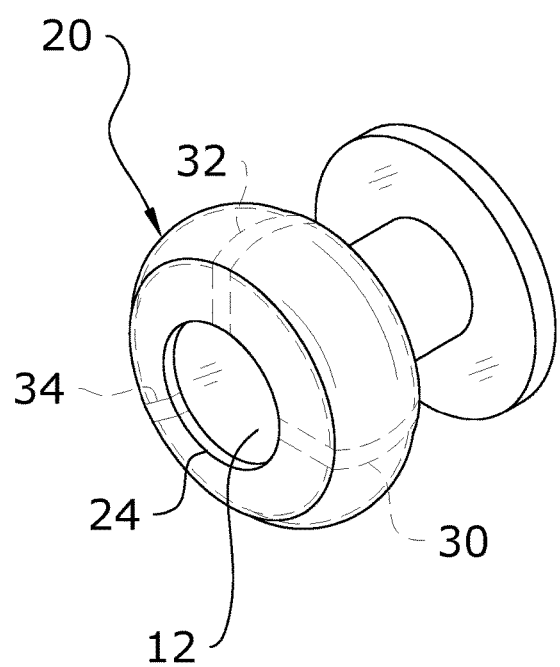
FIG. 6b is a rear upper perspective view of the sleeve heat shrunk upon the knob shaped handle of the door.

The antimicrobial sleeve 20 may have various lengths and widths sufficient to cover a handle or other object 12 to be covered by the antimicrobial sleeve 20. The length of the antimicrobial sleeve 20 is measured from the first end 22 to the second end 24 which preferably forms a straight longitudinal axis. The width of the antimicrobial sleeve 20 is measured from a first side to a second side of the antimicrobial sleeve 20 (e.g. from the left side to the right side). The length of the antimicrobial sleeve 20 is preferably at least two times greater than the width as illustrated in FIGS. 1a through 2b of the drawings. Alternatively, the width may be equal to or greater than the length of the antimicrobial sleeve 20 for knob types of handles as illustrated in FIG. 6a of the drawings.

As an example, if a handle to be covered has a length of approximately 3 inches, the antimicrobial sleeve 20 preferably has a length of 3 inches or greater. Furthermore, if the handle has a width of approximately 0.9 inches, the antimicrobial sleeve 20 preferably has a width of 1 inch or greater.

Figure 7A:
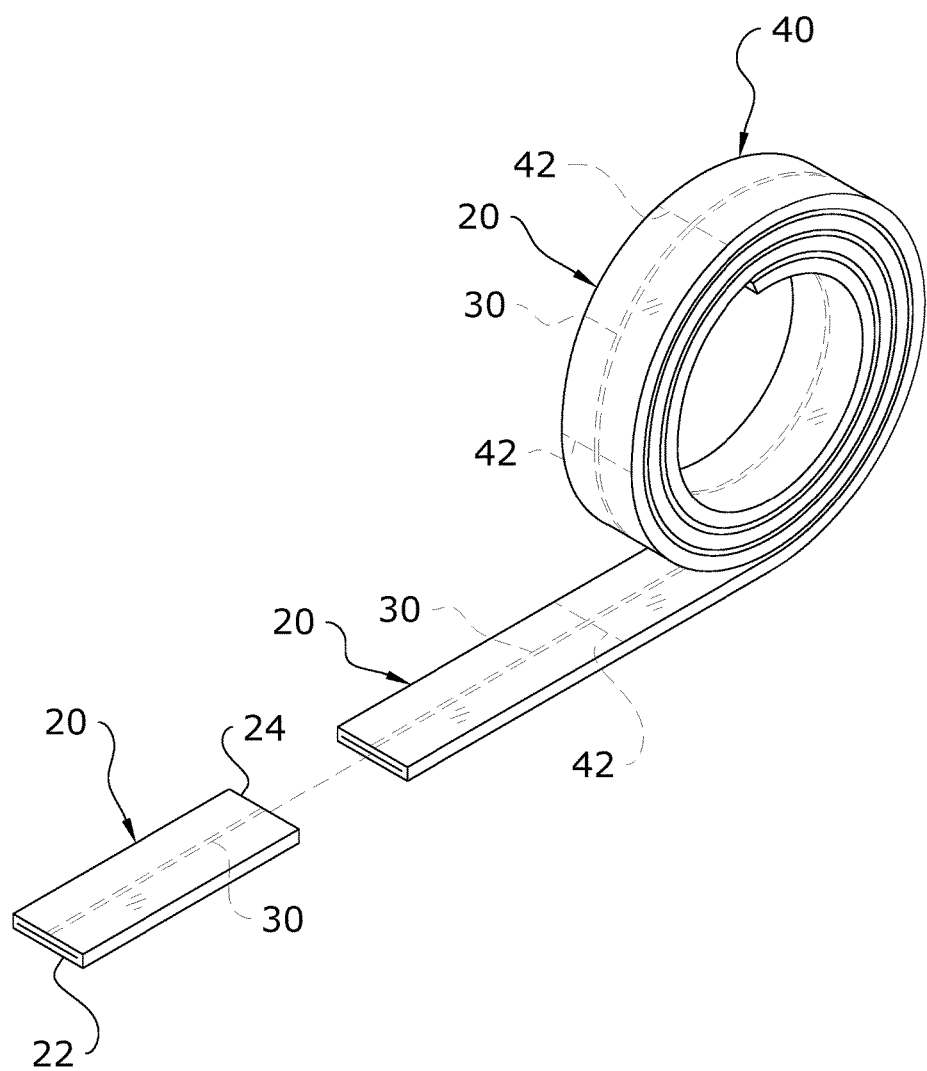
FIG. 7a is an upper perspective view of a roll of a plurality of the sleeves with separation perforations.
Figure 7B:
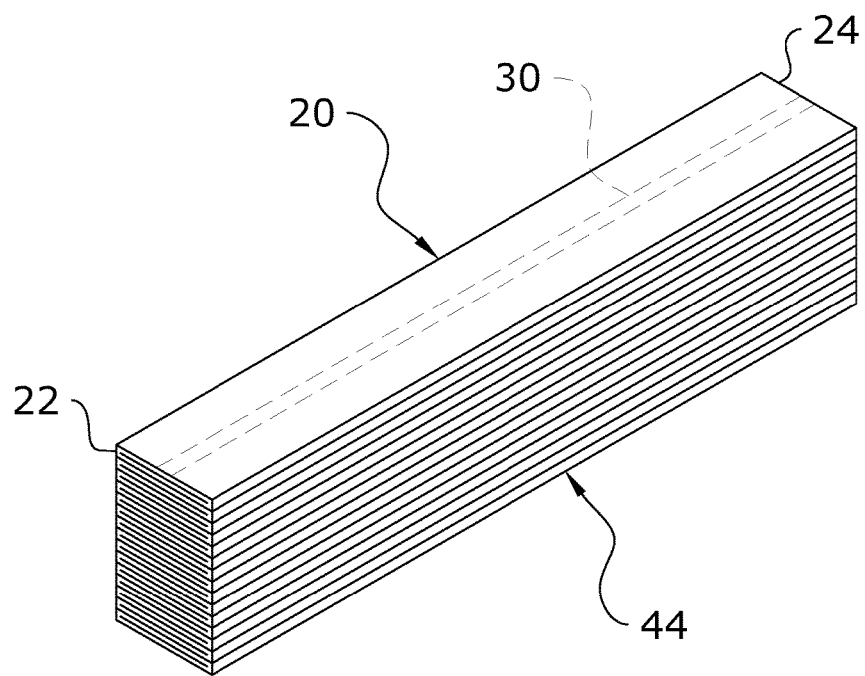
FIG. 7b is an upper perspective view of a stack of a plurality of sleeves in a flattened storage state.

The cross sectional shape of the antimicrobial sleeve 20 may be comprised of any shape including flat as illustrated in FIG. 7b of the drawings. The antimicrobial sleeve 20 will form to the shape of the object 12 being attached to such as a handle including curves and narrower portions. The antimicrobial sleeve 20 may be cut to a desired length by the end user to accommodate smaller handles.

Figure 1B:
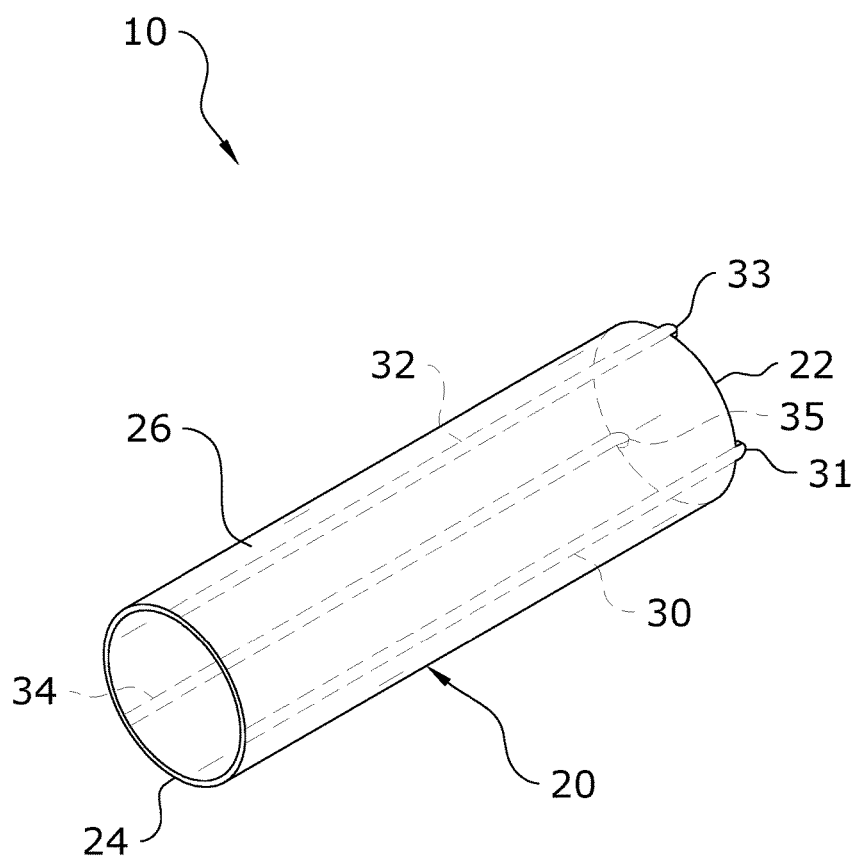
FIG. 1b is a rear upper perspective view of the present invention wherein the second end of the sleeve is comprised of an open end.
Figure 2A:
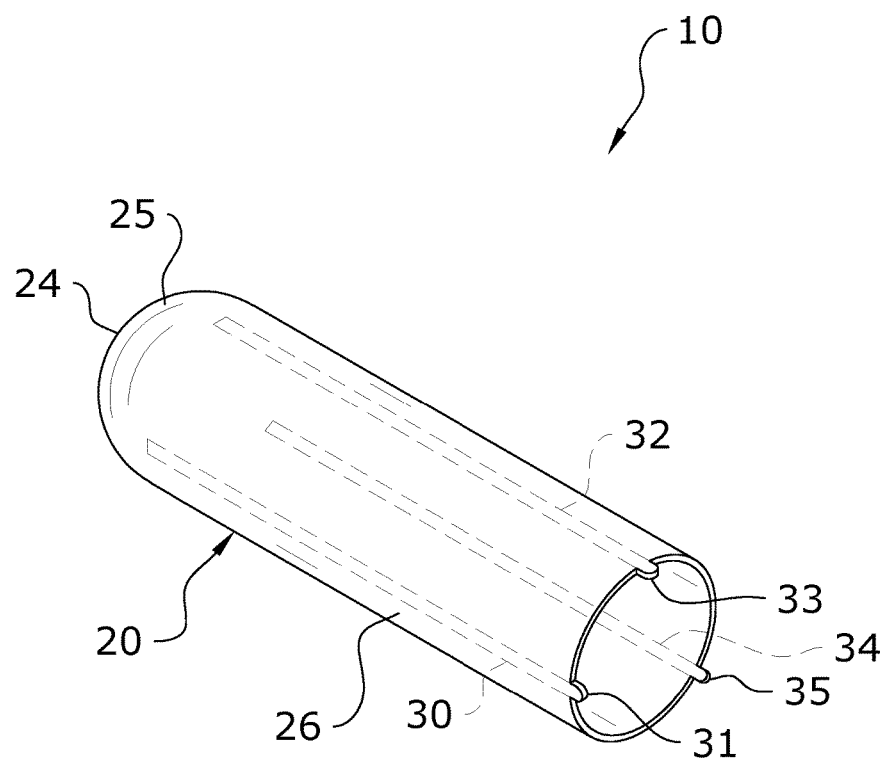
FIG. 2a is a front upper perspective view of the present invention.
Figure 2B:
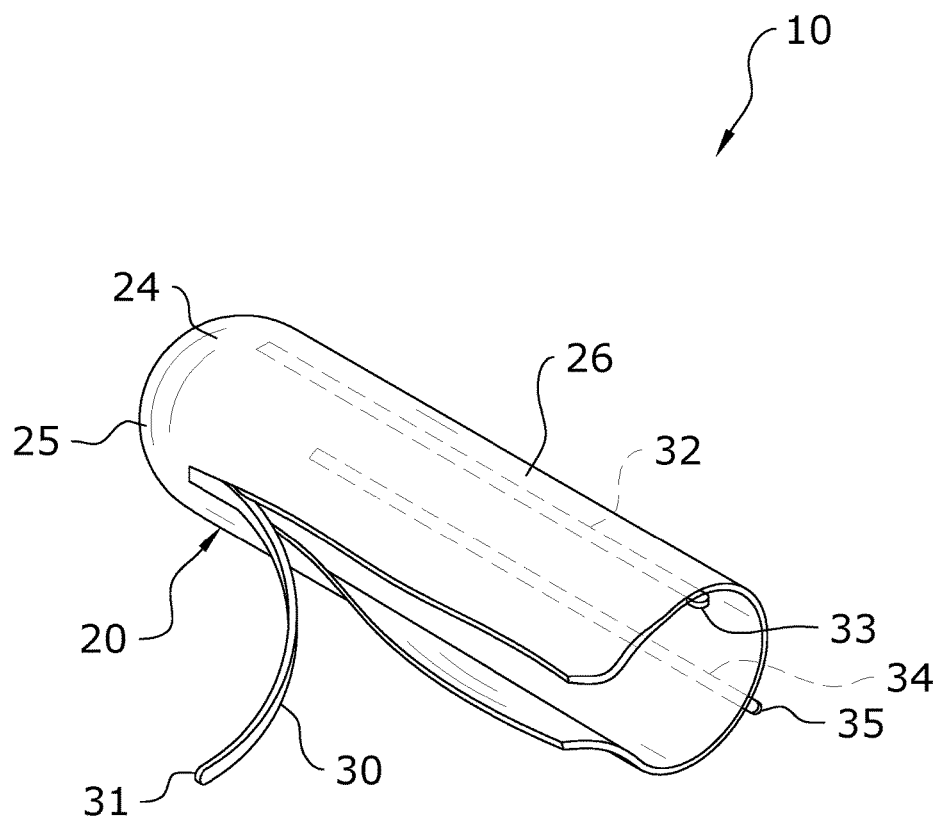
FIG. 2b is a front upper perspective view of the present invention with a first tear strip removed.

Both the first end 22 and the second end 24 of the antimicrobial cover may be comprised of an open end as illustrated in FIG. 1b of the drawings. Alternatively, the second end 24 of the antimicrobial sleeve 20 may be comprised of a closed end 25 as illustrated in FIGS. 1a, 2a and 2b of the drawings. The closed end 25 may be comprised of a curved structure as illustrated in FIG. 1a of the drawings or a flat structure that is transverse with respect to the longitudinal axis of the antimicrobial sleeve 20.

The open ends of the antimicrobial sleeve 20 are preferably sufficient in size to receive the object 12 such as handle. The openings at the end of the antimicrobial sleeve 20 may be smaller in size than the interior lumen of the antimicrobial sleeve 20. At least the first end 22 of the antimicrobial cover is open to allow for receiving and positioning of the antimicrobial sleeve 20 upon the handle.

C. Heat Shrinkable Material.

The antimicrobial sleeve 20 is further preferably comprised of a heat shrinkable material such as a heat shrinkable plastic film that is comprised of a polymer plastic film or shrink wrap tubing (e.g. polyethylene film, polyvinyl chloride film, polyolefin film). When heat is applied to the antimicrobial sleeve 20, the antimicrobial sleeve 20 shrinks upon the object 12 such as a handle to be covered thereby frictionally retaining the antimicrobial sleeve 20 upon the object 12.

The plastic film used may have various thicknesses depending upon the application such as 12, 15, 19, 25, 30, 40, 50 or more microns. The plastic film may have one or more layers with at least the outer layer having the antimicrobial additive. The typical heat required to shrink the antimicrobial sleeve 20 is approximately between 200 to 375 degrees Fahrenheit.

D. Antimicrobial Additive.

The antimicrobial sleeve 20 is preferably comprised of plastic material having an antimicrobial additive to inhibit and reduce the growth of microorganisms. The antimicrobial additive in the plastic material further preferably kills microorganisms. In particular, the antimicrobial sleeve 20 is preferably comprised of a plastic film having the antimicrobial additive. Silver-based antimicrobial additives for plastics are well known in the plastics industry and are suitable for usage within the heat shrinkable plastic film for the antimicrobial sleeve 20. The antimicrobial additive may be directly blended with the plastic film to form the antimicrobial sleeve 20 or blended into an original substrate material that is attached to the plastic film used to form the antimicrobial sleeve 20.

E. Tear Strips.

The antimicrobial sleeve 20 may be comprised of a solid sheet of heat shrinkable plastic film. Alternatively, the antimicrobial sleeve 20 preferably includes one or more tear strips 30, 32, 34 that provide for easy removal of the antimicrobial sleeve 20 from the object 12 such as a handle. The tear strips 30, 32, 34 may also be utilized to accommodate objects 12 having a larger portion at one end thereof by partially removing a tear strip 30, 32, 34 to allow for expansion of the width of the corresponding portion of the antimicrobial sleeve 20.

The tear strips 30, 32, 34 preferably extend lengthwise within the antimicrobial sleeve 20. The tear strips 30, 32, 34 may extend along the entire length of the antimicrobial sleeve 20 as illustrated in FIG. 1b or may extend from the first end 22 to near the second end 24 of the antimicrobial sleeve 20 as shown in FIGS. 1a, 2a and 2b.

The tear strips 30, 32, 34 are preferably formed by one or more parallel lines of perforations as illustrated in FIGS. 1a through 2b of the drawings. FIGS. 1a through 2b illustrate each of the tear strips 30, 32, 34 being formed by a parallel pair of perforation lines that extend parallel to the longitudinal axis of the adhesive sleeve. The longitudinal axis extends from the first end 22 to the second end 24 of the antimicrobial sleeve 20. The tear strips 30, 32, 34 may be formed by other known tearing systems such as by including a length of material within the antimicrobial sleeve 20 that is stronger than the plastic film (e.g. tear tape or tear-off ribbon).

The tear strips 30, 32, 34 each further preferably include at least one tab 31, 33, 35 extending outwardly from a first end 22 of the antimicrobial sleeve 20 and/or the second end 24 of the antimicrobial sleeve 20 to assist the user in grasping when heat shrunk on the object 12. The tab 31, 33, 35 for each tear strip 30, 32, 34 may be rounded and is preferably easy for the user to lift from the object 12 to initiate the pulling of the tear strip 30, 32, 34 to separate from the antimicrobial sleeve 20.

FIGS. 1a through 2b illustrate using three tear strips 30, 32, 34, however, it can be appreciated that 1, 2, 3, 4, 5 or more tear strips 30, 32, 34 may be utilized within an antimicrobial sleeve 20 preferably spaced equidistantly about the antimicrobial sleeve 20 (e.g. if three tear strips 30, 32, 34 are used, the tear strips 30, 32, 34 are preferably 120 degrees apart from one another when viewed from the first end 22 of the adhesive sleeve). The tear strips 30, 32, 34 may also not be parallel to the longitudinal axis of the antimicrobial sleeve 20.

F. Dispensing of Antimicrobial Sleeves.

The antimicrobial sleeves 20 may be individually formed and stored within a flat stacked state as illustrated in FIG. 7b of the drawings. The user simply removes an antimicrobial sleeve 20, expands the antimicrobial sleeve 20 from the flat state and then positions the antimicrobial sleeve 20 upon the object 12.

Alternatively, the antimicrobial sleeves 20 may be comprised of a solid length of tubular material having a plurality of separation perforations 42 that extend transverse with respect to the longitudinal axis, with the length of tubular material wound into a roll 40 as illustrated in FIG. 7a of the drawings. The user pulls upon the antimicrobial sleeve 20 exposed from the roll 40 thereby tearing the same from the roll 40 along the corresponding separation perforations 42. The separation perforations 42 are preferably equidistantly spaced apart to form the length of each of the antimicrobial sleeves 20.

Alternatively, the length of tubular material may not have separation perforations 42 and instead the user manually cuts the desired length of the tubular material to form the antimicrobial sleeve 20 (e.g. if they require a 6 inch length of antimicrobial sleeve 20, they would cut a 6 inch length from the roll 40 with a scissors or knife).

G. Heater Unit.

Figure 3A:
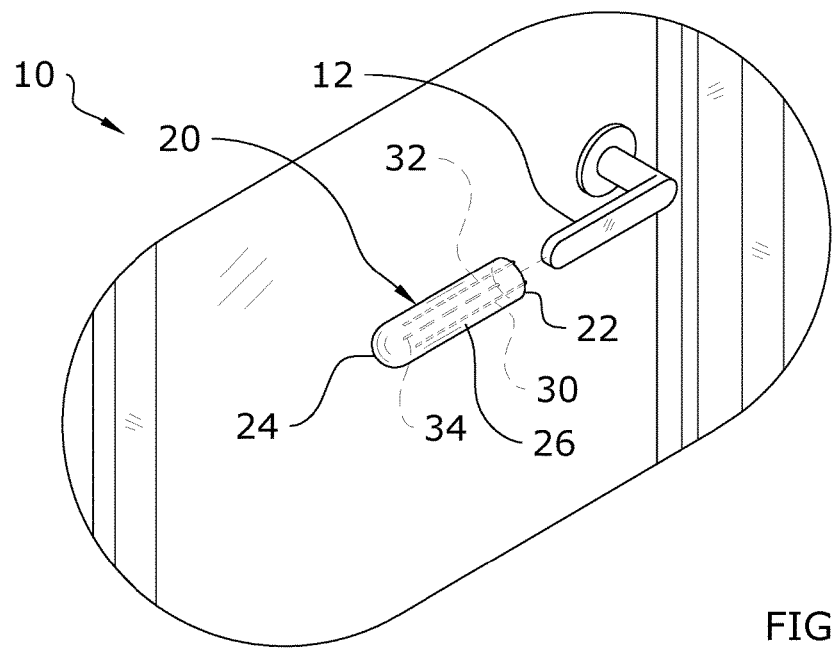
FIG. 3a is a rear upper perspective view of the present invention prior to being positioned upon a handle of a door.
Figure 3B:
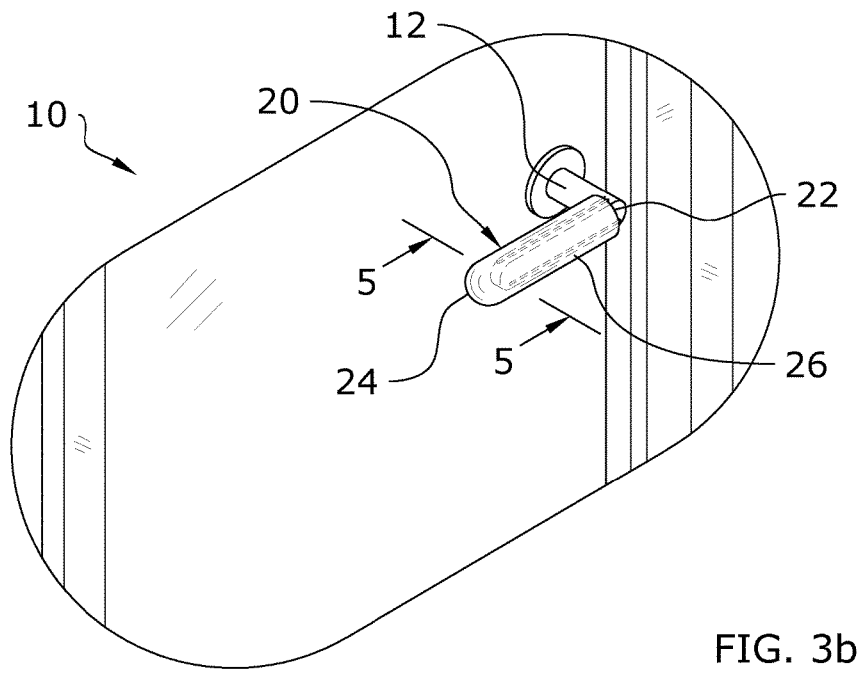
FIG. 3b is a rear upper perspective view of the present invention positioned upon the handle of the door.
Figure 3C:
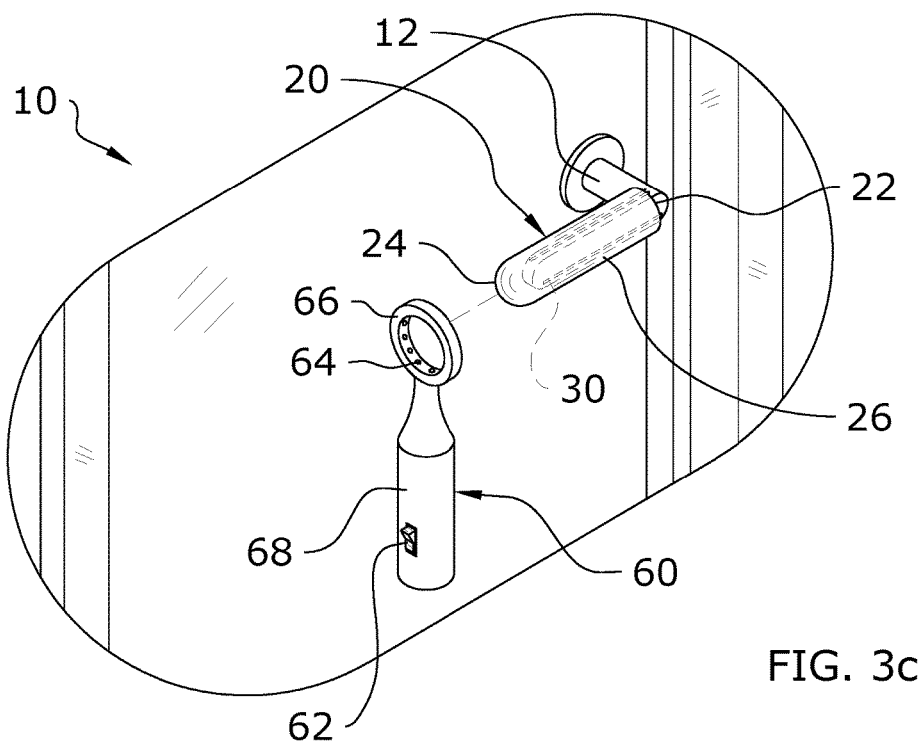
FIG. 3c is a rear upper perspective view of the present invention positioned upon the handle of the door with a heat unit aligned with the handle.
Figure 3D:
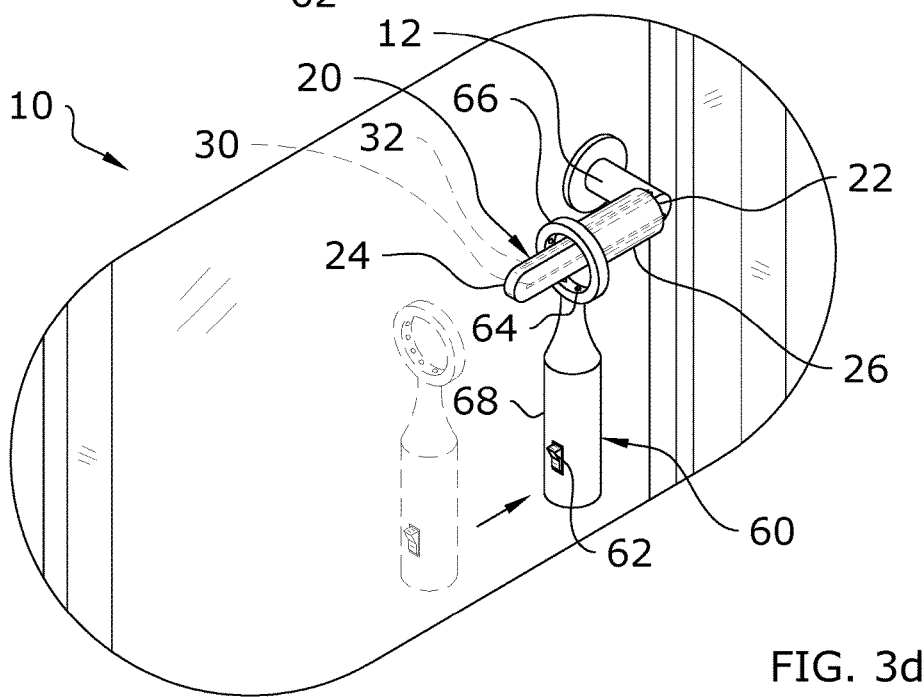
FIG. 3d is a rear upper perspective view of the present invention positioned upon the handle of the door with the heat unit applying heat to the sleeve thereby shrinking the sleeve upon the handle.

FIGS. 3c through 3d of the drawings illustrate a suitable heater unit 60 for applying heat to the antimicrobial sleeve 20 when positioned upon an elongated object 12 such as a door handle. The heater unit 60 includes a body portion 68 for gripping by the user and a ring member 66 extending from the body portion 68. The ring member 66 includes a center opening that is sufficient in size to be positioned over the object 12 such as a door handle as illustrated in FIG. 3d of the drawings.

One or more heat units 64 are attached to the interior portion of the ring member 66 to apply heat inwardly towards the antimicrobial sleeve 20 to shrink the antimicrobial sleeve 20 upon the object 12. The heat units 64 are preferably comprised of infrared heating elements (e.g. tungsten wire) that is electrically powered by a power switch 62 that is electrically connected between the heating units and a power source (e.g. battery or wall outlet). It is preferable that the heat units 64 are equidistantly spaced about the interior portion of the ring member 66 and spaced apart so that they provide adequate consistent heat to the antimicrobial sleeve 20 when moved along the object 12 covered by the antimicrobial sleeve 20.

H. Steam Unit.

Figure 4A:
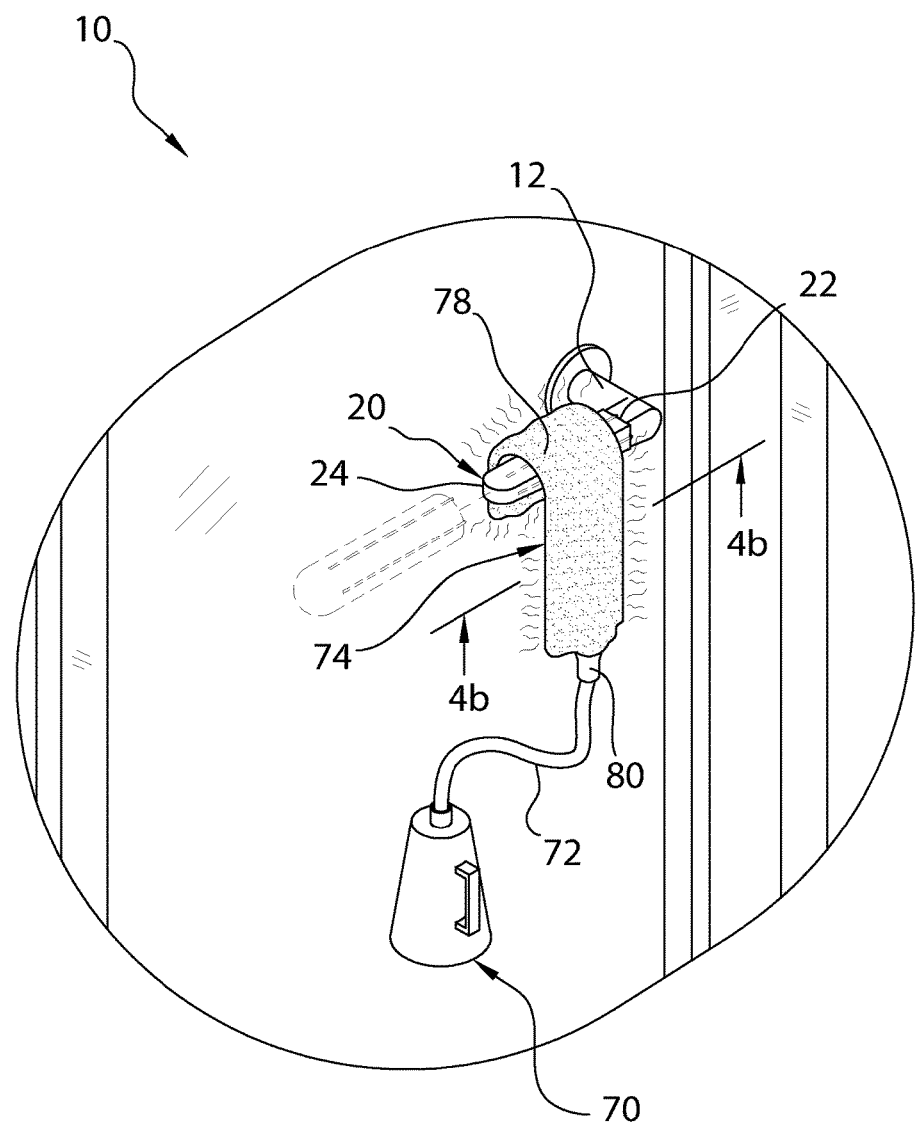
FIG. 4a is a rear upper perspective view of the present invention being heat shrunk upon the handle of the door with a steam unit.
Figure 4B:
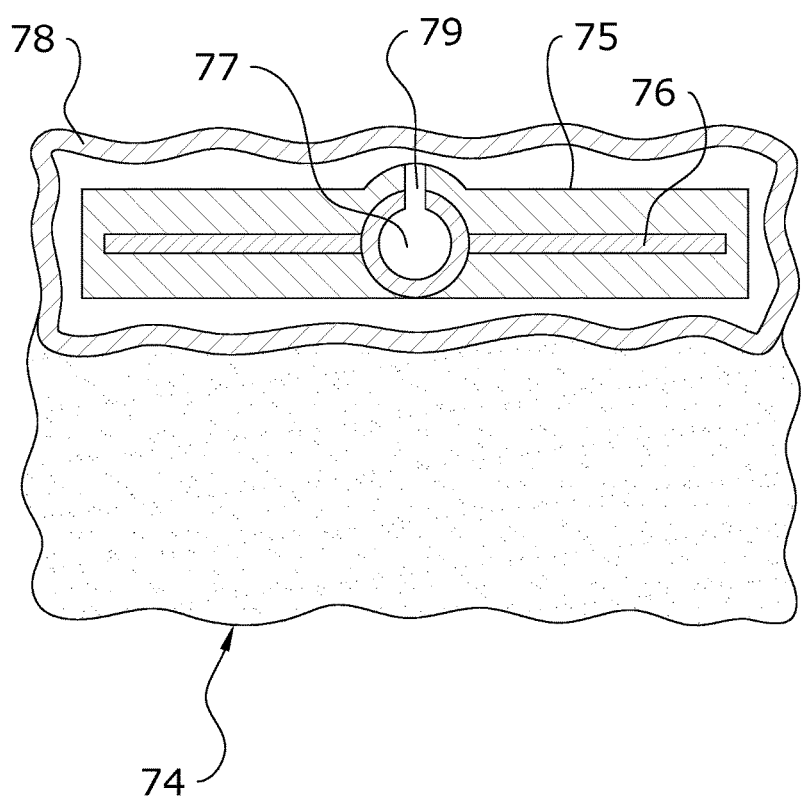
FIG. 4b is a cross sectional view taken along line 4b-4b of FIG. 4a illustrating the structure of the steam applicator.

Another suitable device for applying heat to the antimicrobial sleeve 20 is the steam unit 70 illustrated in FIGS. 4a and 4b of the drawings. The steam unit 70 is preferably comprised of a portable device that may be carried by a handle or a strap attached to the steam unit 70.

The steam unit 70 is comprised of a steam generator that generates pressurized steam. A hose 72 extends from the steam generator to a steam applicator 74 that dispenses the steam upon the antimicrobial sleeve 20. The user passes the steam applicator 74 along the antimicrobial sleeve 20 when positioned on the object 12 thereby applying steam and shrinking the antimicrobial sleeve 20 upon the object 12.

The steam applicator 74 is preferably comprised of a flexible and bendable structure to allow for adjustment of the shape of the steam applicator 74 thereby ensuring consistent steam/heat application to the antimicrobial sleeve 20. FIG. 4a illustrate the steam applicator 74 being formed to extend straight from the hose 72 and then is curved at the outer portion thereof to wrap around the handle.

Figure 25:
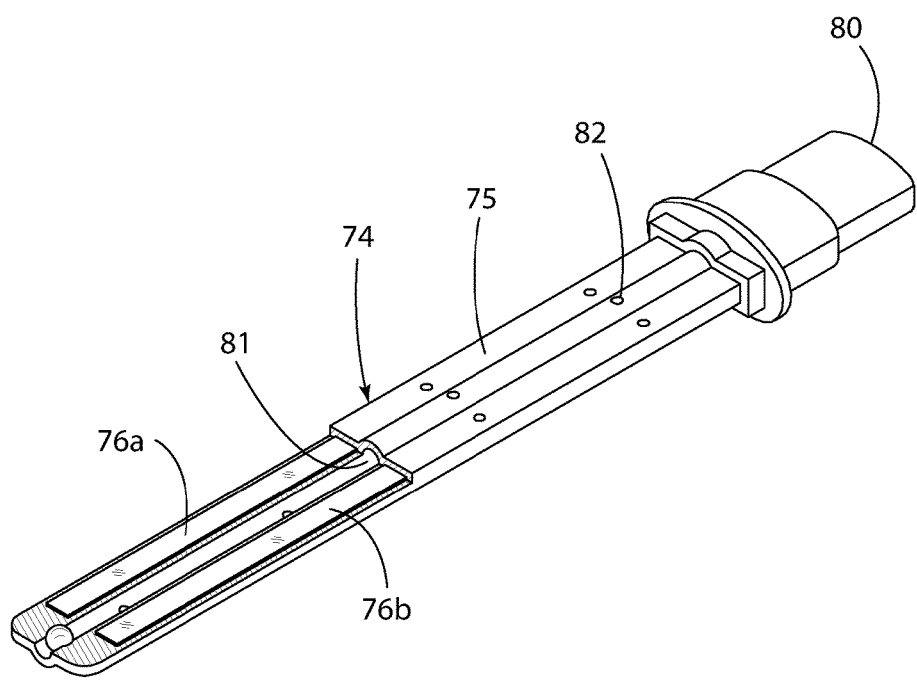
FIG. 25 is a partial cutaway of a front upper perspective view of an embodiment of the steam applicator.
Figure 26:
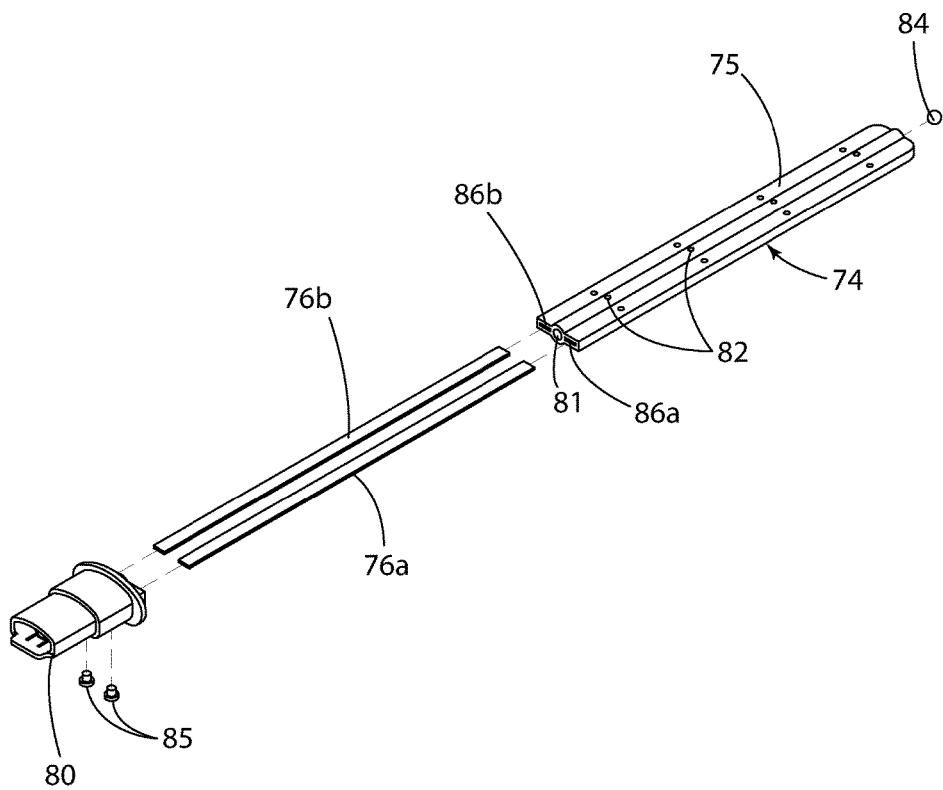
FIG. 26 is an exploded rear perspective view of an embodiment of the steam applicator.
Figure 27:
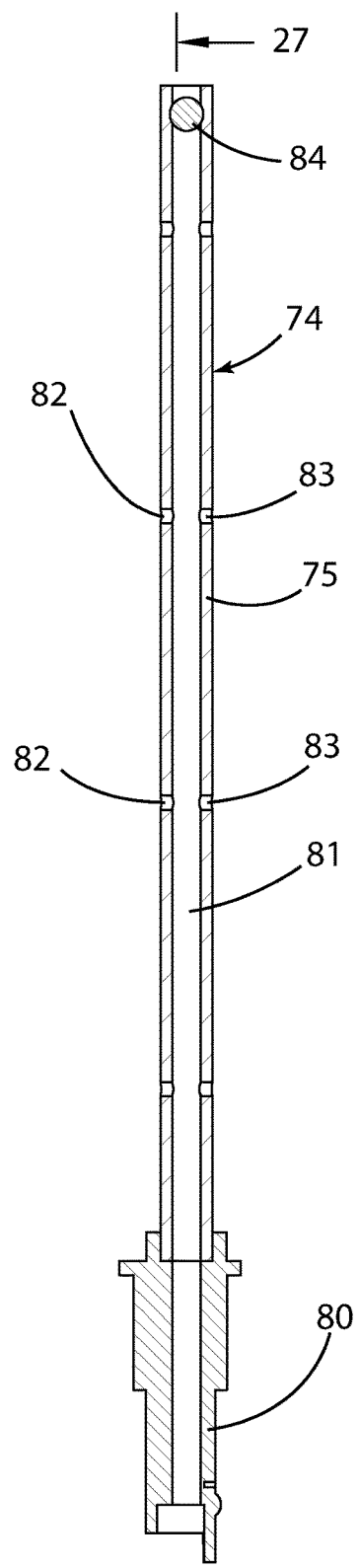
FIG. 27 is a cross sectional view taken along line 27-27 of FIG. 21.
Figure 28:
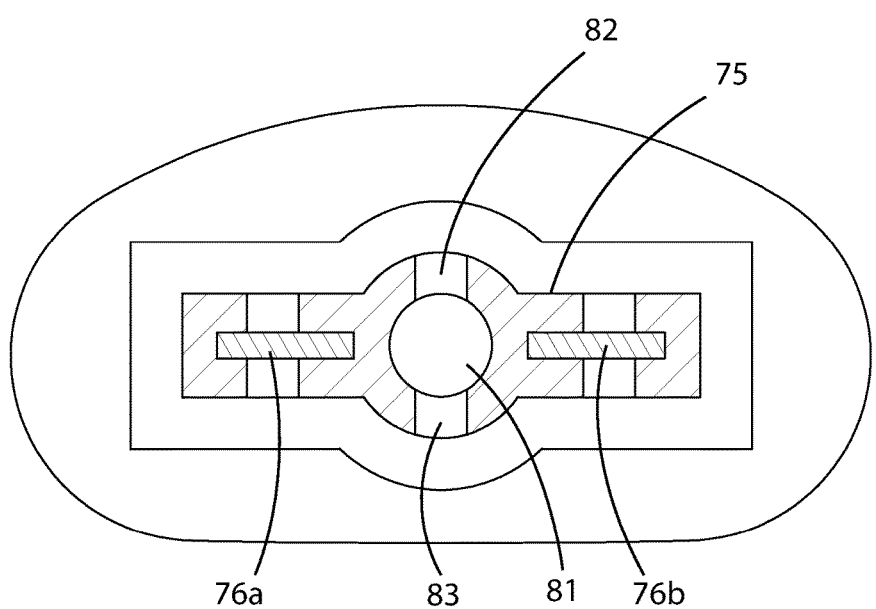
FIG. 28 is a cross sectional view taken along line 28-28 of FIG. 21.
Figure 29:
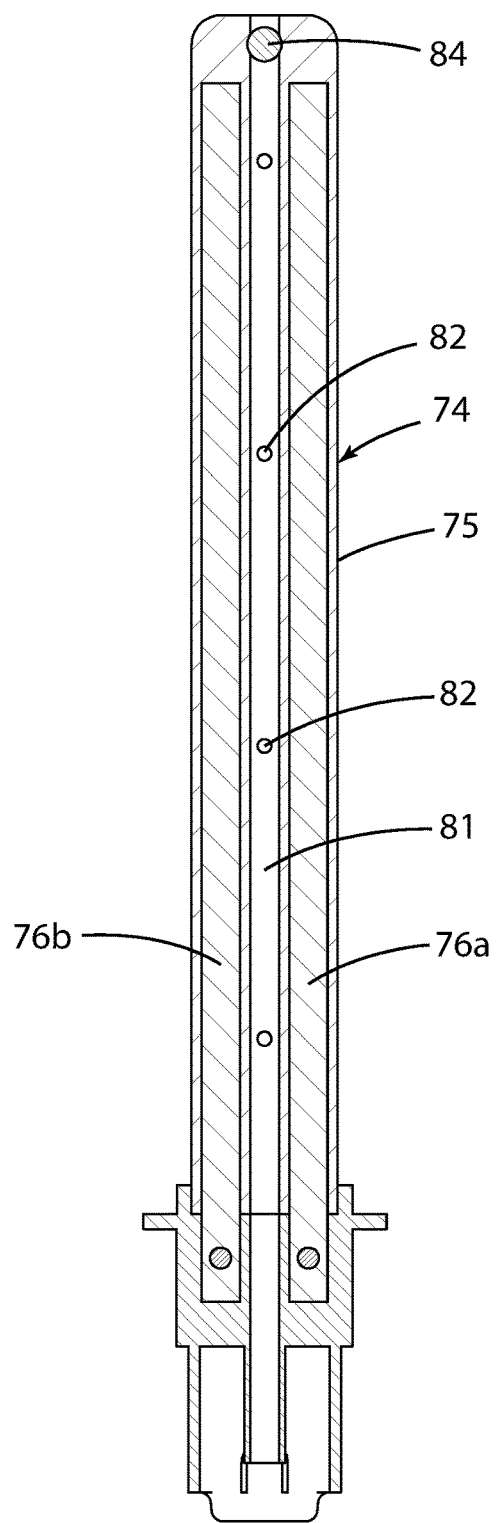
FIG. 29 is a cross sectional view taken along line 29-29 of FIG. 23.

The steam applicator 74 is preferably comprised of a flexible member 76 comprised of metal or other bendable material. The flexible member 76 may be comprised of a single member or multiple members extending along a portion of the length of the steam applicator 74 or along the entire length of the steam applicator 74. In one embodiment, the flexible member is comprised of a first flexible member 76a and a second flexible member 76b that extend along a substantial length of the steam applicator 74 as shown in FIGS. 25 through 29 of the drawings. The first flexible member 76a and the second flexible member 76b are preferably parallel with respect to one another forming a prong type of structure as illustrated in FIG. 29 of the drawings. The first flexible member 76a and the second flexible member 76b are further are each preferably comprised of a flat elongated member and are further positioned on opposing sides of the steam channel 77 or a steam passage 81 formed within the resilient cover 78 that surrounds the flexible members 76a, 76b. As shown in FIGS. 25 and 29, the first flexible member 76a and the second flexible member 76b are connected to and extend outwardly from an inlet connector (may be connected together with fasteners 85). The first flexible member 76a and the second flexible member 76b may be received within a corresponding first and second receiver passage 86a, 86b of the steam applicator 74.

Figure 20:
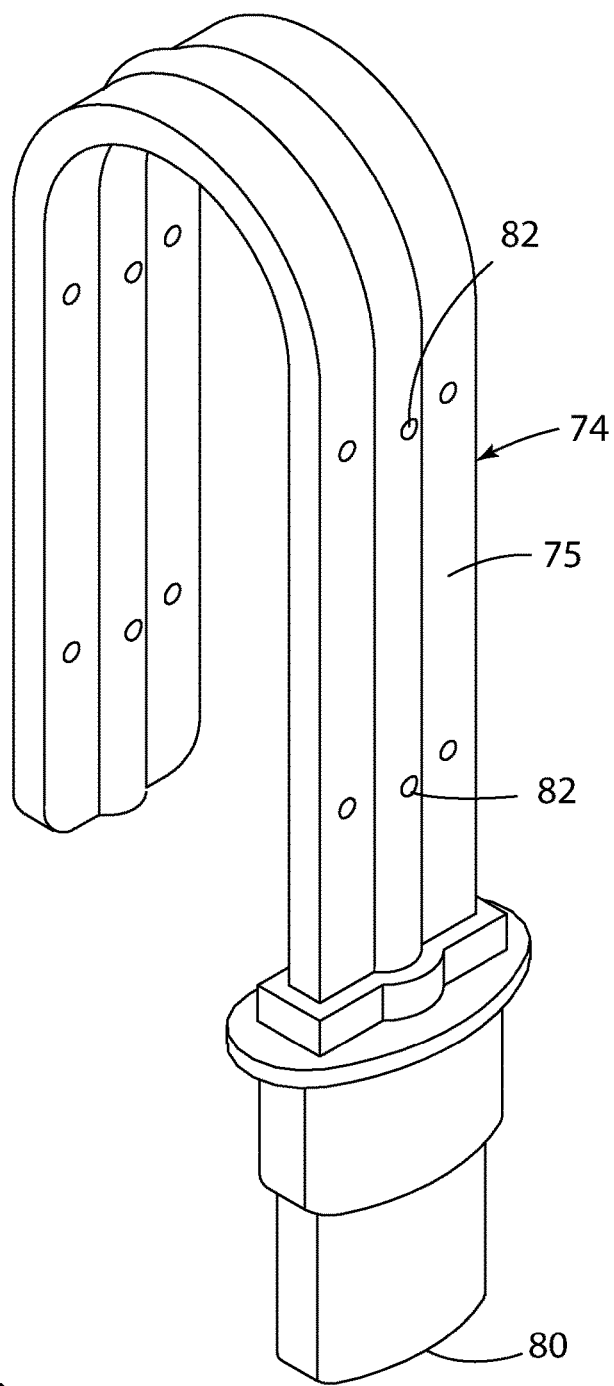
FIG. 20 is an upper perspective view of an embodiment of the steam applicator in a curved state.
Figure 21:
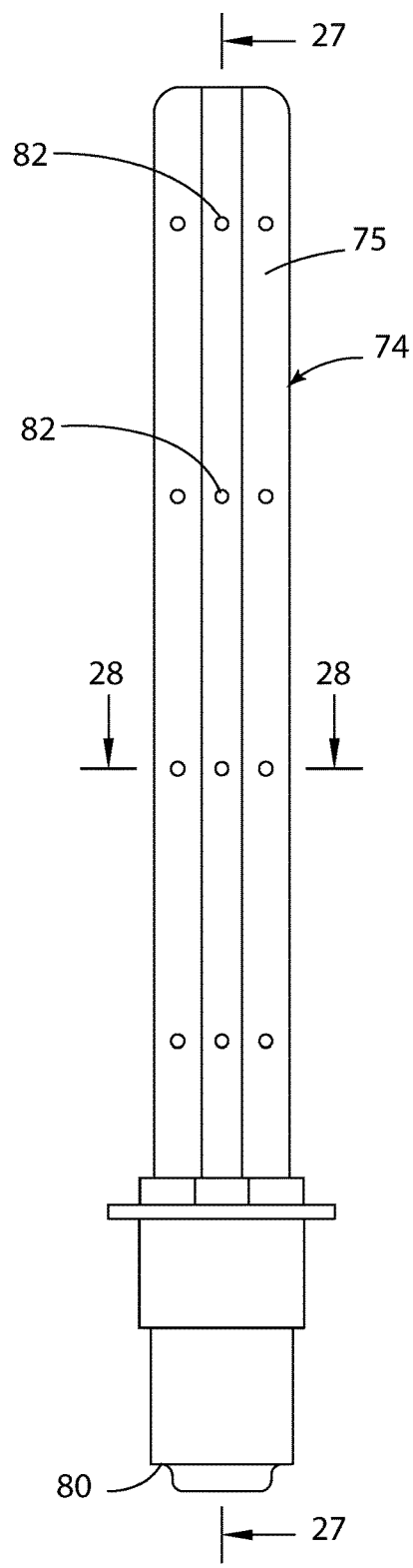
FIG. 21 is a top view of an embodiment of the steam applicator.

The first flexible member 76a and the second flexible member 76b may have a substantially straight state to retain the steam applicator 74 in a correspondingly substantially straight state as shown in FIGS. 18, 19, 21 through 25. Alternatively, the first flexible member 76a and the second flexible member 76b may have a bent state (e.g. a portion that is curved or otherwise angled with respect to another portion) to retain the steam applicator 74 in a correspondingly substantially bent state as shown in FIG. 20. The first flexible member 76a and the second flexible member 76b may be formed to various shapes and configurations to be used in various applications where steams is needed to be applied.

The flexible member 76 includes a steam channel 77 extending along a central portion thereof and further includes a plurality of steam ports 79 fluidly connected to the steam channel 77 within the flexible member 76. The steam channel 77 is fluidly connected to the hose 72 in a removable manner. The flexible member 76 further preferably includes a resilient cover 75 such as rubber (e.g. thermoplastic rubber, thermoplastic elastorme) or plastic that is flexible to prevent the flexible member 76 from damaging the antimicrobial sleeve 20 during installation thereof.

The first flexible member 76a and the second flexible member 76b are preferably molded directly within the flexible member 76 along with the formation of the steam passage 81. The steam passage 81 extends along a significant portion of the resilient cover 75 and is fluidly connected to the inlet connector 80 for fluidly receiving and transferring the steam from the steam unit 70 to external of the steam applicator 74 via the outlets 82, 83. A stopper member 84 (e.g. spherical metal ball such as a metal BB) may be positioned towards the distal end of the steam passage 81 to prevent passage of the steam outside the distal end of the flexible member 76. The stopper member 84 may be inserted into the steam passage prior to, during or after the molding process of molding the resilient cover 75 over the first flexible member 76a and the second flexible member 76b. The steam passage 81 is preferably formed directly within the flexible member as shown in FIG. 28 but may be formed by a tube inserted inside of the flexible member 76 as shown in FIG. 4b of the drawings.

Figure 22:
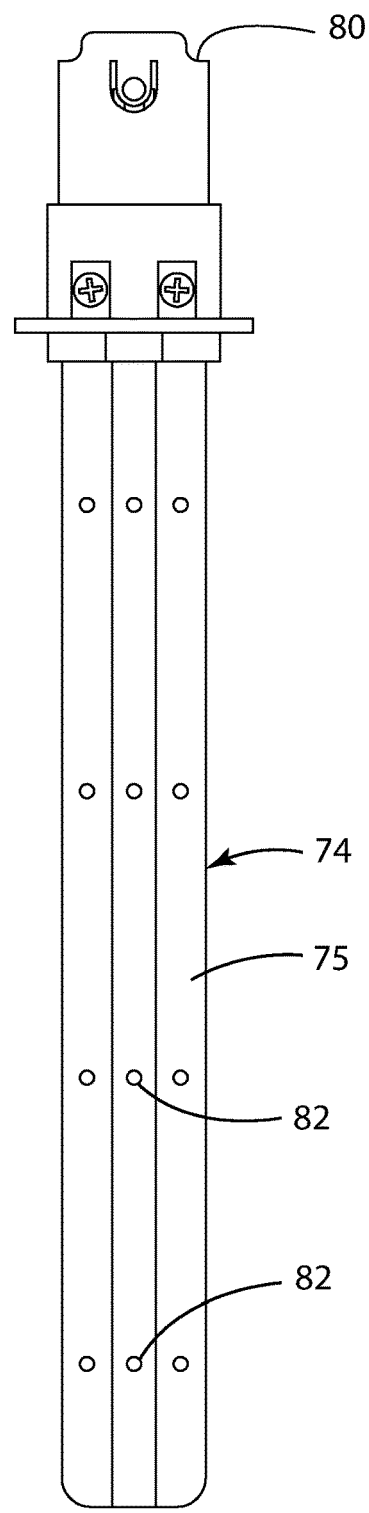
FIG. 22 is a bottom view of an embodiment of the steam applicator.
Figure 23:
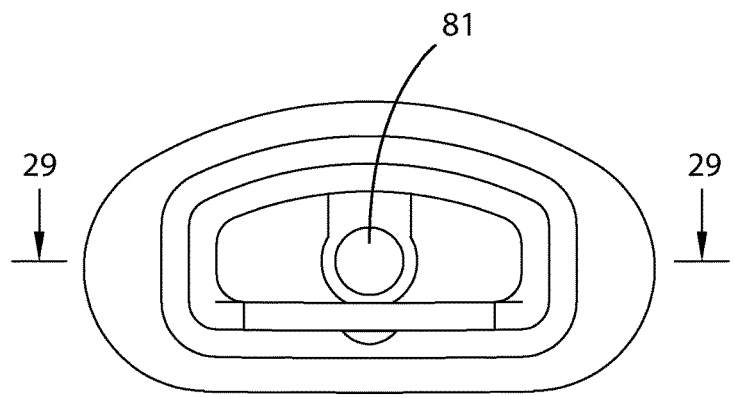
FIG. 23 is a rear end view of an embodiment of the steam applicator.
Figure 24:
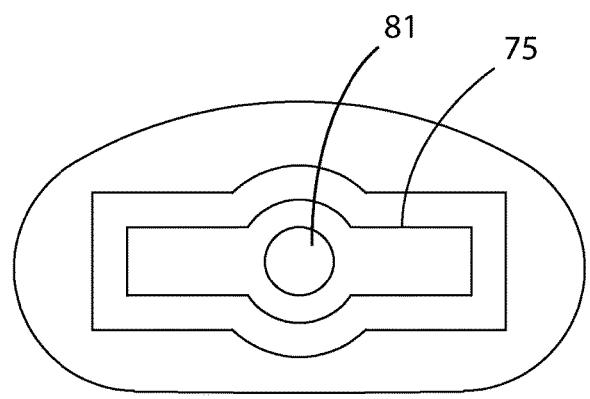
FIG. 24 is a front end view of an embodiment of the steam applicator.

The flexible member 76 has a first side and a second side opposite of the first side. A plurality of first outlets 82 extend through 21 first side of the flexible member 76 into the steam passage 81 as shown in FIGS. 22 and 25 of the drawings to allow for the escape and dispensing of steam from the first outlets 82. A plurality of second outlets 83 extend through the second side of the flexible member 76 into the steam passage 81 as shown in FIGS. 22 and 27 of the drawings to allow for the escape and dispensing of steam from the first outlets 82. The first and second outlets 82, 83 may be aligned with one another or alternatively not aligned with one another. The first and second outlets 82, 83 are preferably large enough to allow for pressurized steam from the steam unit to escape outwardly through the outlets 82, 83 and into the permeable cover 78 for even and consistent application of the steam to the antimicrobial sleeve.

A permeable cover 78 (e.g. cloth covering) is preferably positioned over the flexible member 76 to prevent direct engagement of the flexible member 76 with the antimicrobial sleeve 20 during usage thereof. The permeable cover 78 allows the steam from the steam ports 79 to exit and further evenly distributes the steam. The permeable cover 78 may be removed for periodic cleaning or replacement.

I. Installation and Replacement of the Antimicrobial Sleeve.

Figure 3E:
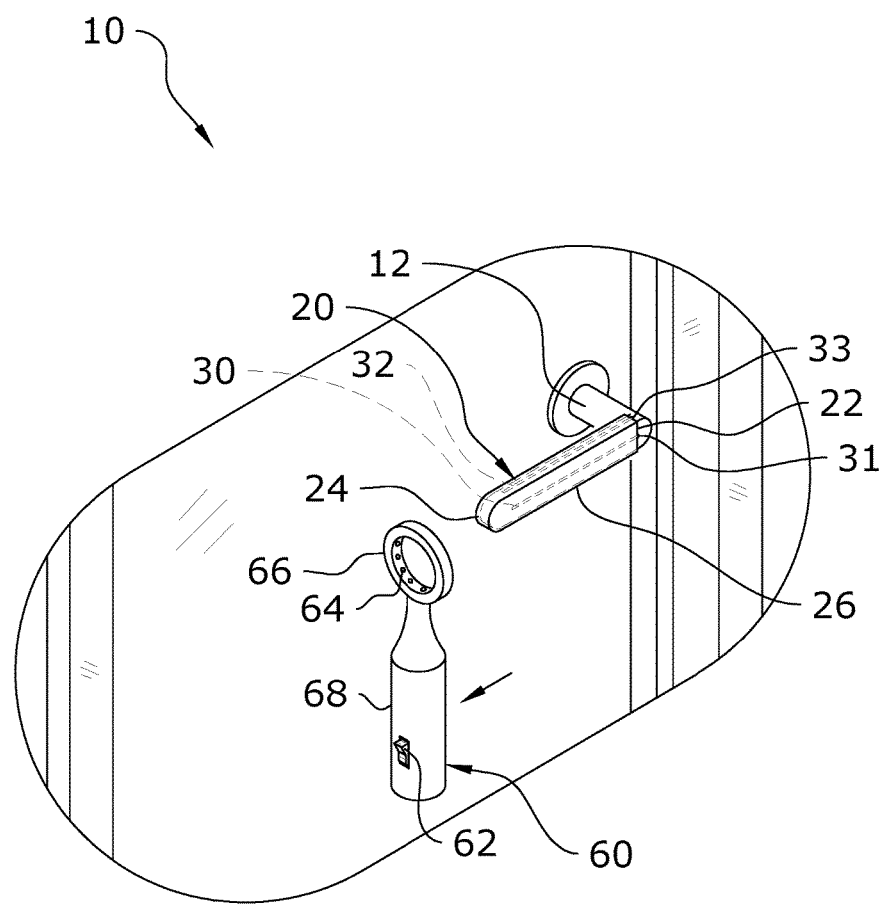
FIG. 3e is a rear upper perspective view of the present invention positioned upon the handle of the door with the heat unit removed after the sleeve is fully heat shrunk upon the handle of the door.
Figure 5A:
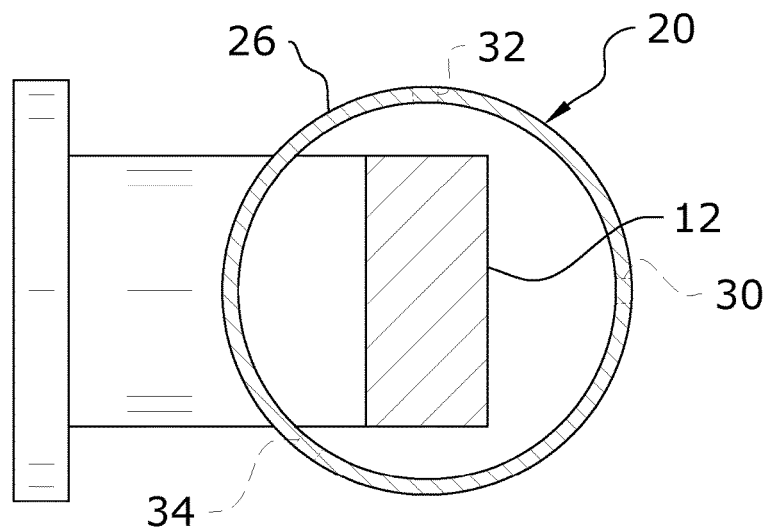
FIG. 5a is a cross sectional view taken along line 5-5 of FIG. 3b prior to the sleeve being heat shrunk upon the handle of the door.
Figure 5B:
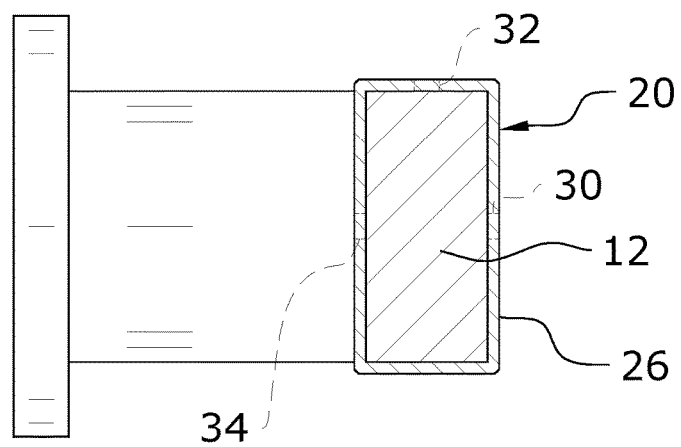
FIG. 5b is a cross sectional view taken along line 5-5 of FIG. 3b after the sleeve is heat shrunk upon the handle of the door.

To install the antimicrobial sleeve 20, the user positions the antimicrobial sleeve 20 upon the object 12 such as the handle of a door as illustrated in FIGS. 3a and 3b of the drawings. The user then positions the ring member 66 over the antimicrobial sleeve 20 and the object 12 to apply heat to the antimicrobial sleeve 20 thereby resulting in the shrinking of the antimicrobial sleeve 20 upon the handle as illustrated in FIGS. 3d, 3e and 5b of the drawings. Heat may be applied to only a portion of or the entire portion of the antimicrobial sleeve 20. However, it is preferable that the entire portion of the antimicrobial sleeve 20 is heated to ensure proper shrinking and a tight bond of the antimicrobial sleeve 20 upon the object without movement.

Once the antimicrobial sleeve 20 is fully shrunk upon the object 12 thereby in frictional engagement therewith and is not movable upon the object 12, the user removes the heater unit 60 to terminate the application of heat to the antimicrobial sleeve 20. The object 12 may then be used as originally intended by users such as a handle of a door. When the users grasp the object 12 with their hands, any bacteria from their hands transferred to the antimicrobial sleeve 20 are preferably killed or at least inhibited by the antimicrobial additive within the antimicrobial sleeve 20 thereby reducing the chances of spreading to other users that make contact with the object 12.

After a period of time when the antimicrobial additives lose their effectiveness and/or the antimicrobial sleeve 20 becomes contaminated (or damaged), the user then must replace the antimicrobial sleeve 20. To replace, the user first removes the antimicrobial sleeve 20 by pulling upon at least one tear strip 30, 32, 34 thereby releasing the antimicrobial sleeve 20 from the object 12 and allowing removal therefrom as illustrated in FIG. 2b of the drawings. If the antimicrobial sleeve 20 does not include a tear strip, then the user will have to cut the antimicrobial sleeve 20 with a cutting device or manually tear the antimicrobial sleeve 20. The user then repeats the above process to install a new antimicrobial sleeve 20. This process continues repeatedly as needed to maintain the desired level of antimicrobial protection for the object 12.

J. Antimicrobial Material in Sheet and Rolled Form.

Figure 8A:
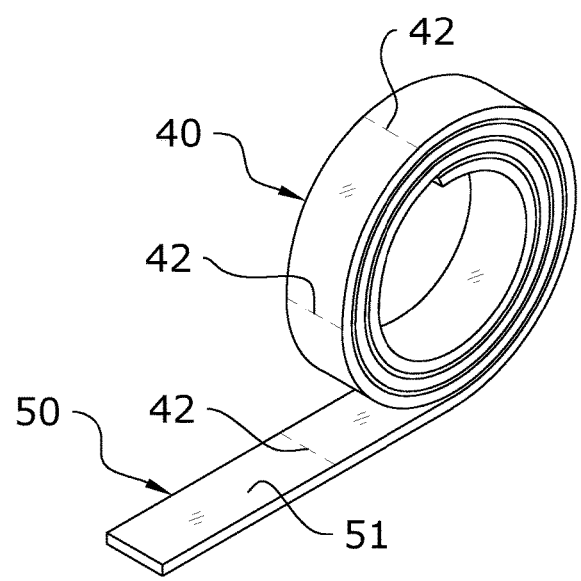
FIG. 8a is an upper perspective view of a roll of antimicrobial covers having an adhesive backing.

FIGS. 8a through 9c illustrate an antimicrobial sheet 50 that includes an adhesive backing 51 attached to an antimicrobial layer 54. The antimicrobial layer 54 may be comprised of the same material as the antimicrobial sleeve 20. The adhesive backing 51 may be comprised of any adhesive material capable of removably securing the antimicrobial sheet 50 to an object 12 such as a handle. Alternatively, an adhesive may be applied to the antimicrobial layer 54 and/or the object 12 by the user prior to installation. FIG. 8a illustrates the antimicrobial sheets 50 wound into and dispensed from a roll 40 having a plurality of separation perforations 42 to form each antimicrobial sheet 50 (alternatively, the user may cut the desired length of antimicrobial sheet 50). The antimicrobial sheet 50 may have various widths (e.g. 1, 2, 4, 9 inches). The antimicrobial additive may be directly blended with the material used form the antimicrobial layer 54 or blended into an original substrate material that is attached to the material used to form the antimicrobial layer 54.

Figure 8B:
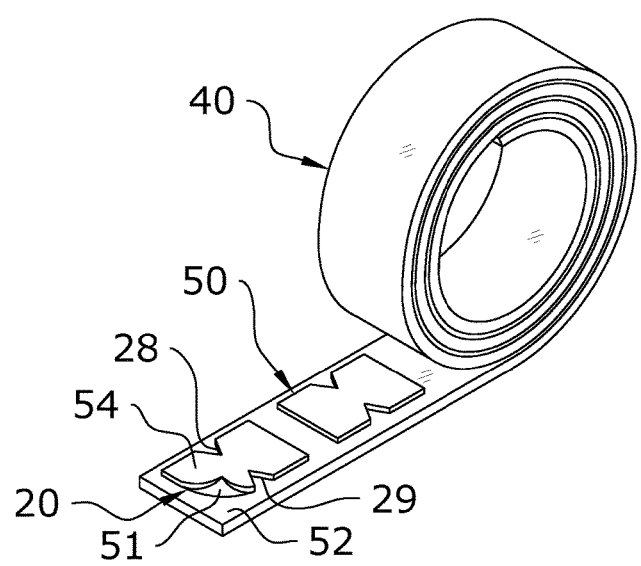
FIG. 8b is an upper perspective view of a roll of antimicrobial covers removably attached to a dispensing sheet.
Figure 9A:
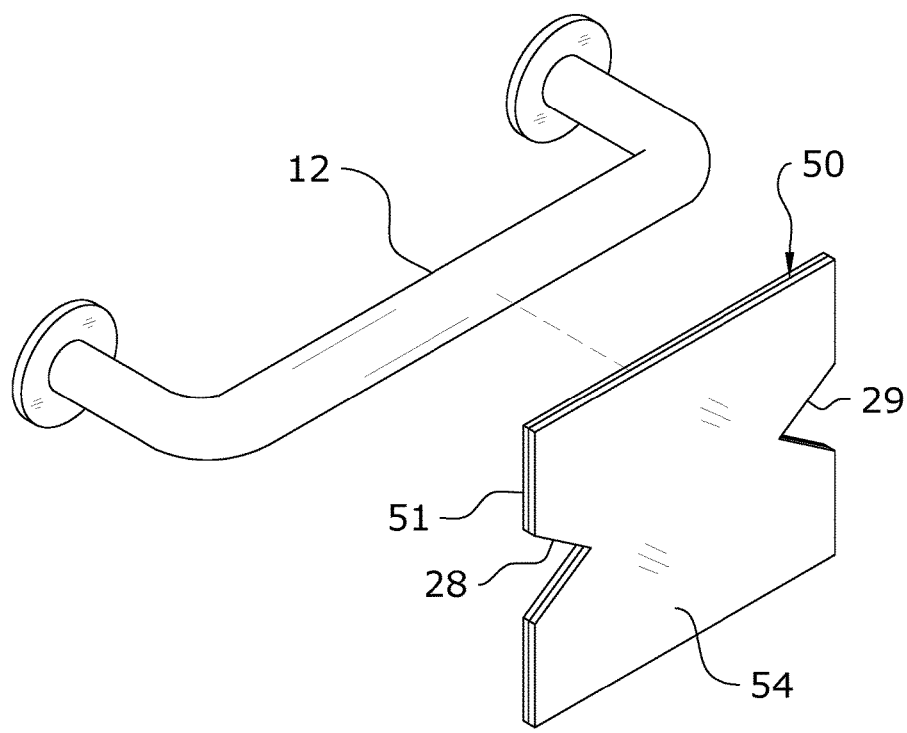
FIG. 9a is an exploded upper perspective view of an antimicrobial cover having an adhesive backing prior to attachment to a handle having an elongated structure.

FIG. 8b illustrates a plurality of antimicrobial sheets 50 removably attached to a roll 40 of a length of dispensing sheet 52. The antimicrobial sheets 50 may include cutouts, notches and different shapes to conform to the structure and shape of an object 12 to be attached to. As illustrated in FIG. 9a, the antimicrobial sheet 50 has a first cutout 28 and a second cutout 29 on opposing sides of the antimicrobial sheet 50 to form around the extension portions of a bar handle.

Figure 10:
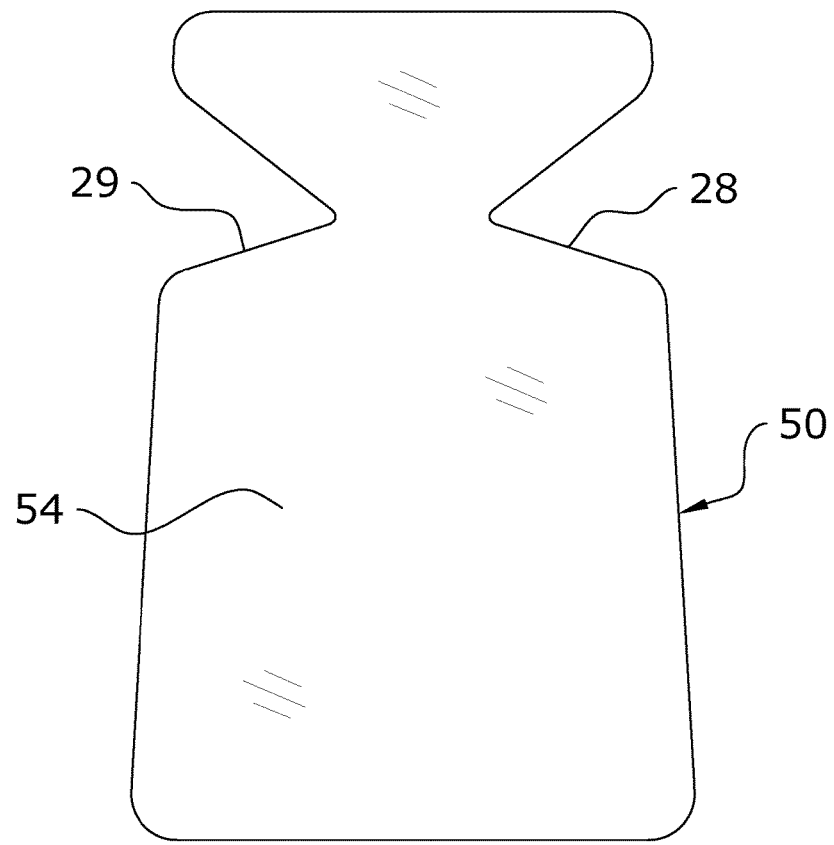
FIG. 10 is a top view of a customized individual antimicrobial cover having an adhesive backing for an ADA handle with an angled end portion.
Figure 11:
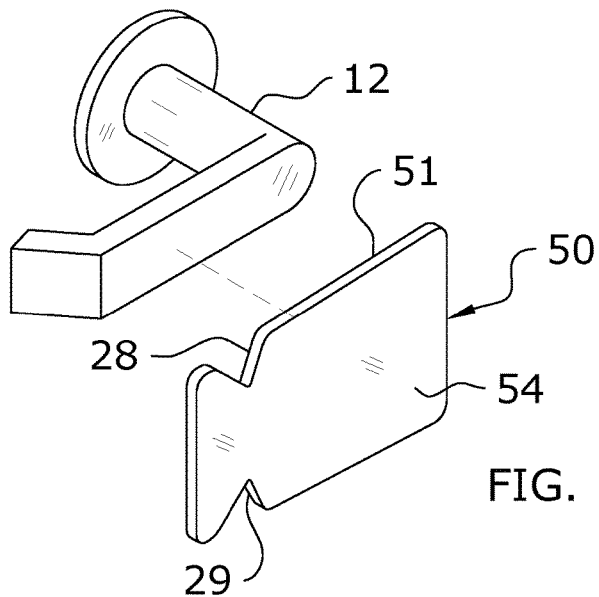
FIG. 11 is an exploded upper perspective view of customized antimicrobial cover with respect to the ADA handle with an angled end portion.
Figure 12:
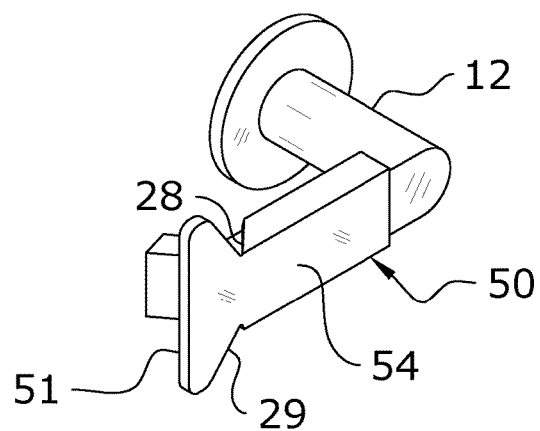
FIG. 12 is an upper perspective view of the customized antimicrobial cover with the main portion attached to the ADA handle.
Figure 13:
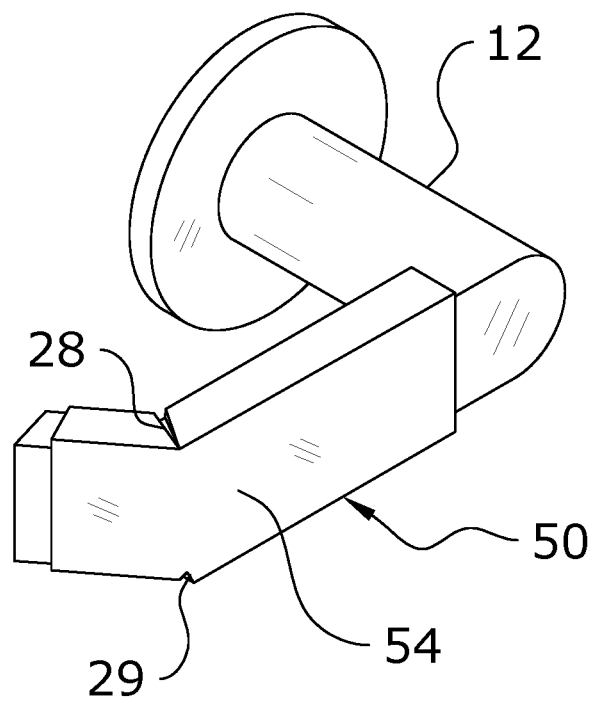
FIG. 13 is an upper perspective view of the customized antimicrobial cover fully attached to the ADA handle.
Figure 14:
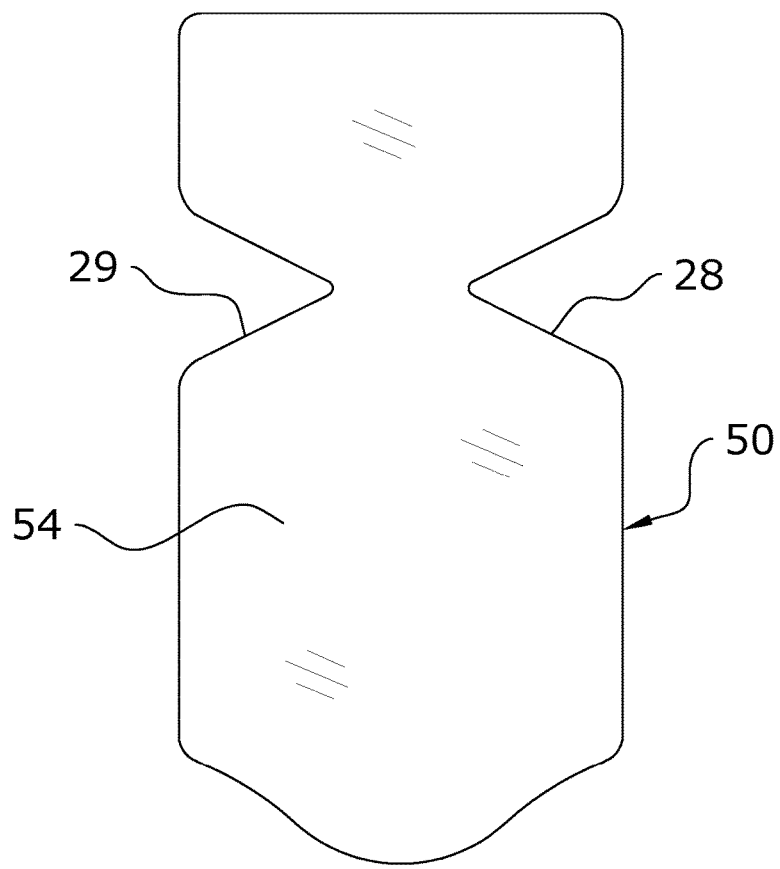
FIG. 14 is an alternative design for the customized antimicrobial cover having an adhesive backing.
Figure 15:
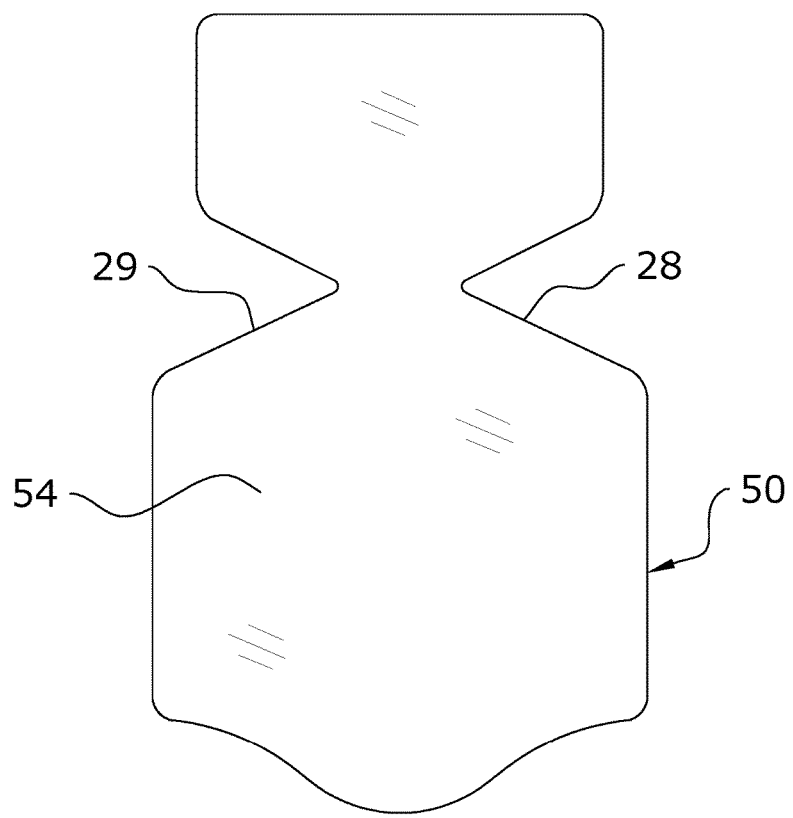
FIG. 15 is another alternative design for the customized antimicrobial cover having an adhesive backing.
Figure 16:
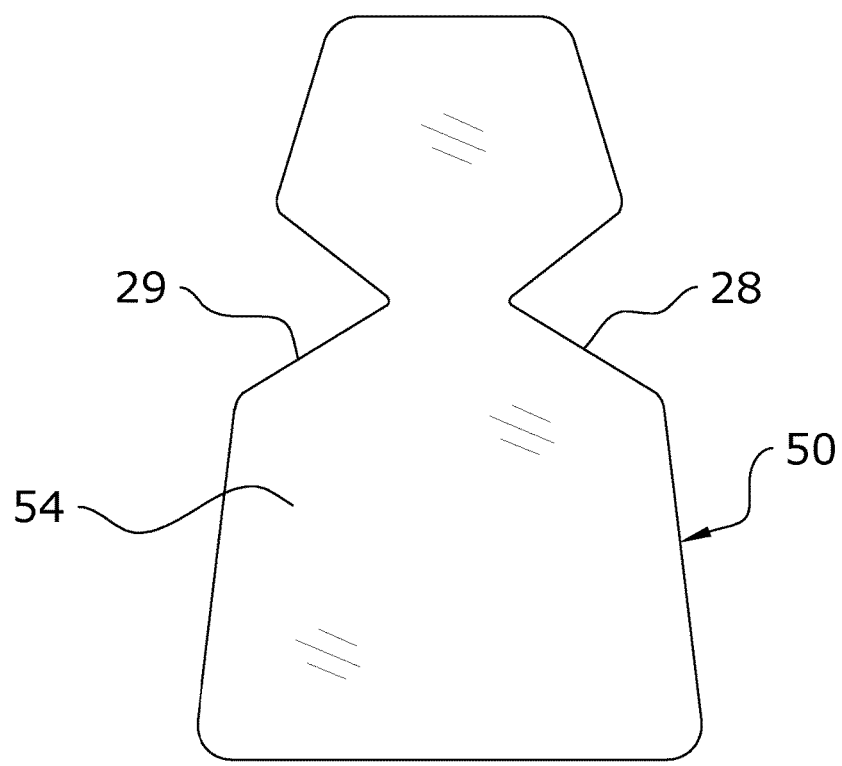
FIG. 16 is another alternative design for the customized antimicrobial cover having an adhesive backing.
Figure 17:
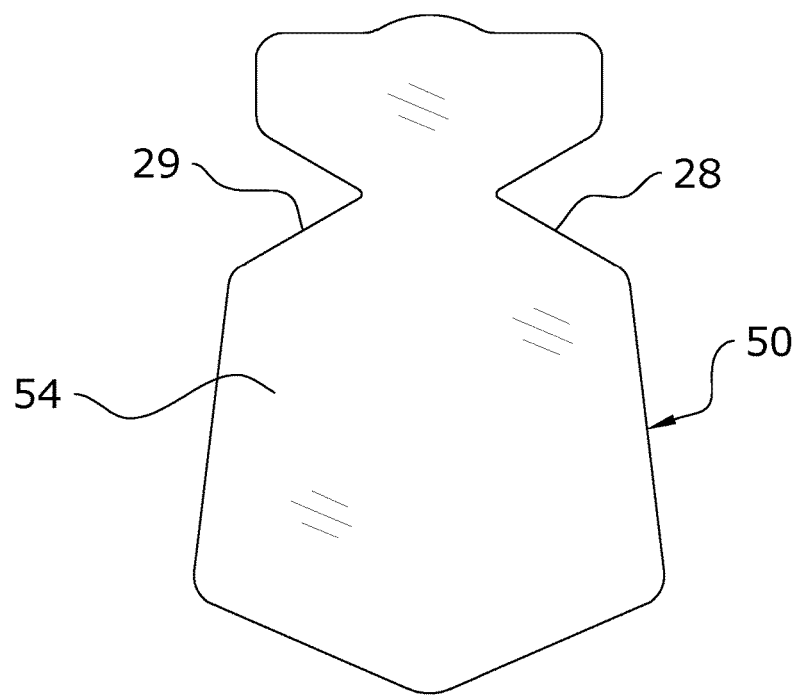
FIG. 17 is another alternative design for the customized antimicrobial cover having an adhesive backing.
Figure 18:
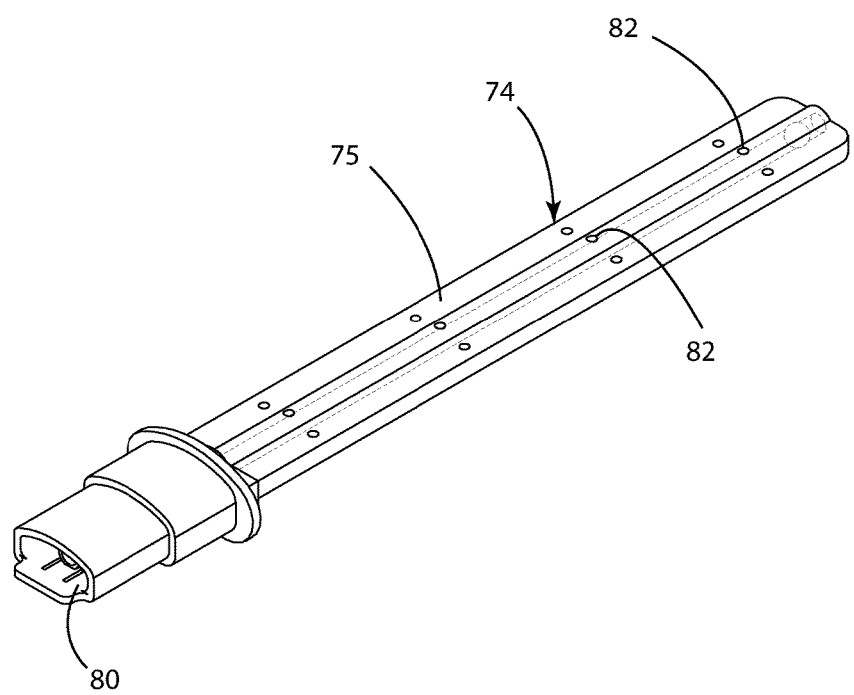
FIG. 18 is a rear upper perspective view of an embodiment of the steam applicator in a substantially straight state.
Figure 19:
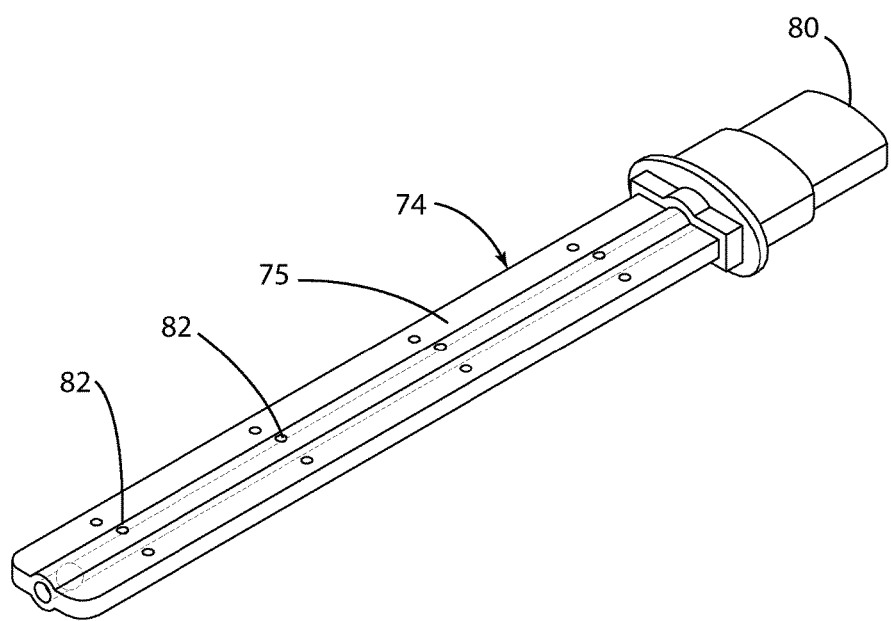
FIG. 19 is a front upper perspective view of an embodiment of the steam applicator in a substantially straight state.

FIGS. 10, 14, 15, 16 and 17 illustrate some exemplary antimicrobial sheets 50 that are customized to fit upon various designs and styles of objects 12 that are non-symmetrical. Various shapes may be utilized for the antimicrobial sheets 50 to fit upon various corresponding designs and styles of objects 12. For example, FIG. 10 illustrates the customized antimicrobial sheet 50 having a pair of cutouts 28, 29 to form a winged distal end extending outwardly from a main body portion. FIGS. 11 through 13 illustrate attaching the customized antimicrobial sheet 50 to an ADA handle having an angled distal portion wherein the main body portion is wrapped around the longer portion of the handle 12 and wherein the winged end portion is wrapped around the shorter distal angled portion of the handle 12. The cutouts 28, 29 provide a hinge portion within the antimicrobial sheet 50 allowing the antimicrobial sheet 50 to fit upon a substantial portion of the handle 12 without buckling or ripples that could interfere with the operation of the handle 12. The adhesive backing 51 secures the customized antimicrobial sheet 50 upon the handle 12.

K. Installation and Replacement of the Antimicrobial Sheet.

Figure 9B:
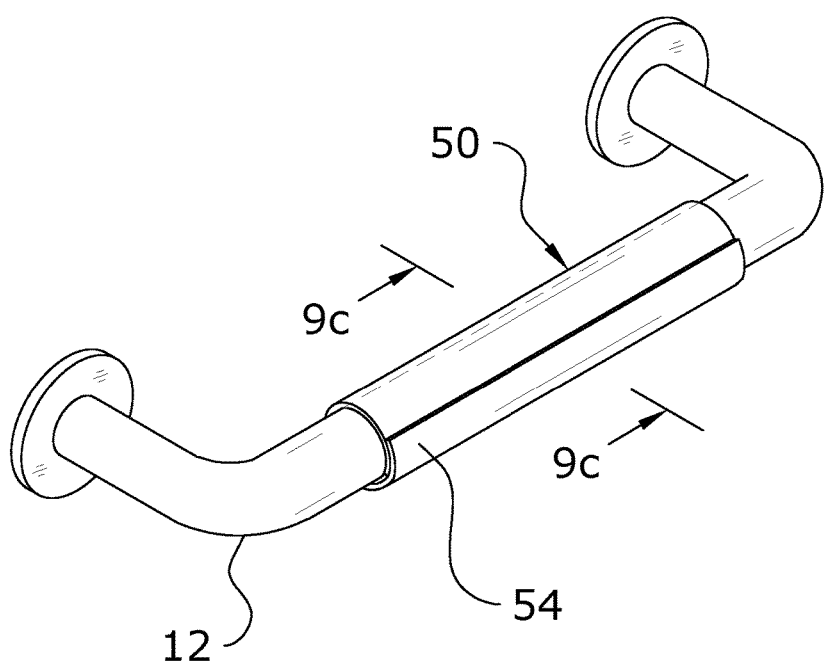
FIG. 9b is an upper perspective view of the antimicrobial cover attached about the exterior surface of the handle.
Figure 9C:
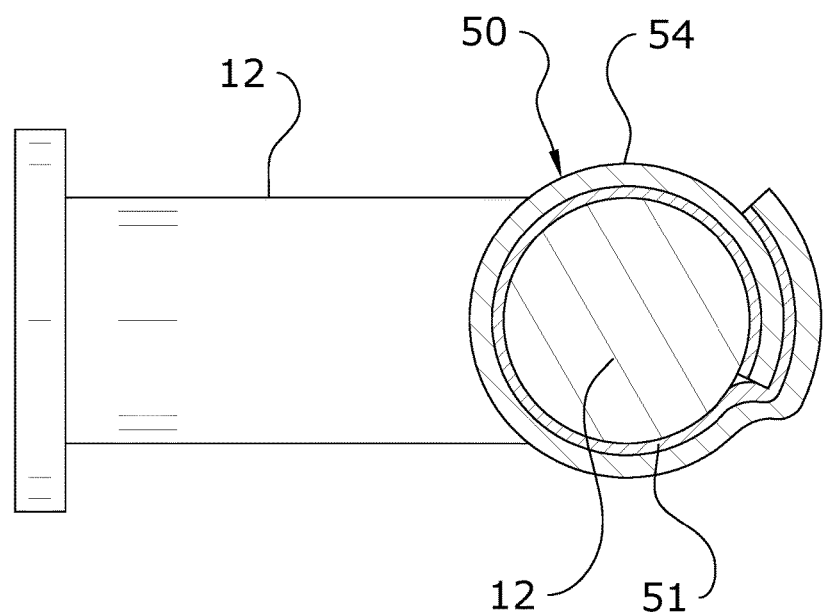
FIG. 9c is a cross sectional view taken along line 9c-9c of FIG. 9b.

To install the antimicrobial sheet 50, the user secures the adhesive backing 51 to the object 12 and wraps the antimicrobial sheet 50 around the object 12 to overlap and prevent any exposed surface of the object 12 as illustrated in FIGS. 9b and 9c of the drawings.

After a period of time when the antimicrobial additives in the antimicrobial layer 54 lose their effectiveness and/or the antimicrobial sheet 50 becomes contaminated (or damaged), the user then must replace the antimicrobial sheet 50. To replace, the user removes the antimicrobial sheet 50 by pulling upon a distal end of the antimicrobial sheet 50 thereby removing from the object 12. The user then repeats the above process to install a new antimicrobial sheet 50. This process continues repeatedly as needed to maintain the desired level of antimicrobial protection for the object 12.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A steam applicator, comprising:
   an inlet connector configured to fluidly connected to a steam unit and receive steam from the steam unit;
   a resilient cover having an inner end, an outer end, a first side and a second side, wherein the inner end of the resilient cover is connected to and extends outwardly from the inlet connector, and wherein the resilient cover is comprised a rubber material;
   a steam passage extending from the inner end of the resilient cover to near the outer end of the resilient cover;
   a first flexible member and a second flexible member extending from the inner end of the resilient cover to near the outer end of the resilient cover, wherein the first flexible member and the second flexible member are molded within the resilient cover; and a plurality of first outlets extending through the first side of the resilient cover to fluidly connect to the steam passage, wherein the plurality of first outlets are configured to dispense pressurized steam received from the steam passage.

2. The steam applicator of claim 1, wherein the first flexible member and the second flexible member are substantially parallel with respect to one another.

3. The steam applicator of claim 2, wherein the first flexible member and the second flexible member are on opposing sides of the steam passage.

4. The steam applicator of claim 3, wherein the portion of the resilient cover surrounding the first flexible member and the second flexible member has a thickness less than the thickness of the resilient cover surrounding the steam passage.

5. The steam applicator of claim 1, wherein the first flexible member and the second flexible member are on opposing sides of the steam passage.

6. The steam applicator of claim 1, wherein the first flexible member and the second flexible member are each comprised of elongated flat members.

7. The steam applicator of claim 1, wherein the first flexible member and the second flexible member are connected to the inlet connector.

8. The steam applicator of claim 1, wherein the first flexible member and the second flexible member are each comprised of a metal material that is bendable.

9. The steam applicator of claim 1, wherein the resilient cover is comprised of a thermoplastic rubber.

10. The steam applicator of claim 1, wherein the steam passage includes a tubular member extending through the resilient cover.

11. The steam applicator of claim 1, including a stopper member positioned within a distal portion of the steam passage.

12. The steam applicator of claim 11, wherein the stopper member is comprised of a spherical member.

13. The steam applicator of claim 11, wherein the stopper member is comprised of a spherical metal ball.

14. The steam applicator of claim 1, including a plurality of second outlets extending through the second side of the resilient cover to fluidly connect to the steam passage, wherein the plurality of second outlets are configured to dispense pressurized steam received from the steam passage.

15. The steam applicator of claim 14, wherein the plurality of first outlets and the plurality of second outlets are each equidistantly spaced part.

16. The steam applicator of claim 14, wherein the plurality of first outlets are each positioned opposite of a corresponding of the plurality of second outlets.

17. A steam applicator, comprising:
an inlet connector configured to fluidly connected to a steam unit and receive steam from the steam unit;
a resilient cover having an inner end, an outer end, a first side and a second side, wherein the inner end of the resilient cover is connected to and extends outwardly from the inlet connector, and wherein the resilient cover is comprised a rubber material;
a steam passage extending from the inner end of the resilient cover to near the outer end of the resilient cover;
a first flexible member and a second flexible member extending from the inner end of the resilient cover to near the outer end of the resilient cover; and
a plurality of first outlets extending through the first side of the resilient cover to fluidly connect to the steam passage, wherein the plurality of first outlets are configured to dispense pressurized steam received from the steam passage;
wherein the first flexible member and the second flexible member are substantially parallel with respect to one another;
wherein the first flexible member and the second flexible member are on opposing sides of the steam passage;
wherein the portion of the resilient cover surrounding the first flexible member and the second flexible member has a thickness less than the thickness of the resilient cover surrounding the steam passage;
wherein the first flexible member and the second flexible member are each comprised of elongated flat members;
wherein the first flexible member and the second flexible member are connected to the inlet connector;
wherein the first flexible member and the second flexible member are each comprised of a metal material that is bendable.

18. A steam applicator, comprising:
an inlet connector configured to fluidly connected to a steam unit and receive steam from the steam unit;
a resilient cover having an inner end, an outer end, a first side and a second side, wherein the inner end of the resilient cover is connected to and extends outwardly from the inlet connector, and wherein the resilient cover is comprised a rubber material;
wherein the resilient cover is comprised of a thermoplastic rubber;
a steam passage extending from the inner end of the resilient cover to near the outer end of the resilient cover;
a first flexible member and a second flexible member extending from the inner end of the resilient cover to near the outer end of the resilient cover; and
a plurality of first outlets extending through the first side of the resilient cover to fluidly connect to the steam passage, wherein the plurality of first outlets are configured to dispense pressurized steam received from the steam passage;
a plurality of second outlets extending through the second side of the resilient cover to fluidly connect to the steam passage, wherein the plurality of second outlets are configured to dispense pressurized steam received from the steam passage;
wherein the first flexible member and the second flexible member are substantially parallel with respect to one another;
wherein the first flexible member and the second flexible member are on opposing sides of the steam passage;
wherein the portion of the resilient cover surrounding the first flexible member and the second flexible member has a thickness less than the thickness of the resilient cover surrounding the steam passage;
wherein the first flexible member and the second flexible member are each comprised of elongated flat members;
wherein the first flexible member and the second flexible member are connected to the inlet connector;
wherein the first flexible member and the second flexible member are each comprised of a metal material that is bendable
wherein the first flexible member and the second flexible member are molded within the resilient cover;
a stopper member positioned within a distal portion of the steam passage.

19. The steam applicator of claim 18, wherein the plurality of first outlets and the plurality of second outlets are each equidistantly spaced part, and wherein the plurality of first outlets are each positioned opposite of a corresponding of the plurality of second outlets.

20. A steam applicator, comprising:
an inlet connector configured to fluidly connected to a steam unit and receive steam from the steam unit;
a resilient cover having an inner end, an outer end, a first side and a second side, wherein the inner end of the resilient cover is connected to and extends outwardly from the inlet connector, and wherein the resilient cover is comprised a rubber material;
a steam passage extending from the inner end of the resilient cover to near the outer end of the resilient cover;
a first flexible member and a second flexible member extending from the inner end of the resilient cover to near the outer end of the resilient cover;
wherein the first flexible member and the second flexible member are substantially parallel with respect to one another;
wherein the first flexible member and the second flexible member are on opposing sides of the steam passage;
wherein the portion of the resilient cover surrounding the first flexible member and the second flexible member has a thickness less than the thickness of the resilient cover surrounding the steam passage; and
a plurality of first outlets extending through the first side of the resilient cover to fluidly connect to the steam passage, wherein the plurality of first outlets are configured to dispense pressurized steam received from the steam passage.

21. The steam applicator of claim 20, wherein the first flexible member and the second flexible member are each comprised of elongated flat members.

22. The steam applicator of claim 20, wherein the first flexible member and the second flexible member are connected to the inlet connector.

23. The steam applicator of claim 20, wherein the first flexible member and the second flexible member are each comprised of a metal material that is bendable.

24. The steam applicator of claim 20, wherein the resilient cover is comprised of a thermoplastic rubber.

25. The steam applicator of claim 20, wherein the steam passage includes a tubular member extending through the resilient cover.

26. The steam applicator of claim 20, including a stopper member positioned within a distal portion of the steam passage.

27. The steam applicator of claim 20, including a plurality of second outlets extending through the second side of the resilient cover to fluidly connect to the steam passage, wherein the plurality of second outlets are configured to dispense pressurized steam received from the steam passage.

28. The steam applicator of claim 27, wherein the plurality of first outlets and the plurality of second outlets are each equidistantly spaced part.

29. The steam applicator of claim 27, wherein the plurality of first outlets are each positioned opposite of a corresponding of the plurality of second outlets.

* * * * *